United States Patent
Shrestha et al.

(10) Patent No.: US 12,369,087 B2
(45) Date of Patent: Jul. 22, 2025

(54) APPARATUS, SYSTEM AND METHOD TO SIGNAL AND EXECUTE CONDITIONAL HANDOVER IN A CELLULAR NETWORK

(71) Applicant: Intel Corporation, Santa Clara, CA (US)

(72) Inventors: Bharat Shrestha, San Diego, CA (US); Candy Yiu, Portland, OR (US); Yi Guo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 16/994,521

(22) Filed: Aug. 14, 2020

(65) Prior Publication Data

US 2020/0383022 A1    Dec. 3, 2020

Related U.S. Application Data

(60) Provisional application No. 62/887,548, filed on Aug. 15, 2019.

(51) Int. Cl.
*H04W 36/08* (2009.01)
*H04W 36/00* (2009.01)
*H04W 36/36* (2009.01)
*H04W 76/27* (2018.01)

(52) U.S. Cl.
CPC ....... *H04W 36/08* (2013.01); *H04W 36/0064* (2023.05); *H04W 36/00838* (2023.05); *H04W 36/362* (2023.05); *H04W 76/27* (2018.02)

(58) Field of Classification Search
CPC ............ H04W 36/00; H04W 36/0055; H04W 36/0083; H04W 36/08; H04W 76/27
See application file for complete search history.

(56) References Cited

U.S. PATENT DOCUMENTS

| | | | |
|---|---|---|---|
| 2018/0343598 A1* | 11/2018 | Xu | H04W 36/033 |
| 2019/0182898 A1* | 6/2019 | Yu | H04W 88/06 |
| 2019/0223073 A1* | 7/2019 | Chen | H04W 36/365 |
| 2020/0351735 A1* | 11/2020 | Latheef | H04W 36/00837 |
| 2021/0176683 A1* | 6/2021 | Min | H04W 36/32 |

FOREIGN PATENT DOCUMENTS

IN    201941017815 A  *  5/2019  ............ H04B 7/063

OTHER PUBLICATIONS

3GPP TS 38.331; 3rd Generation Partnership Project; Technical Specification Group Radio Access Network; NR; Radio Resource Control (RRC) protocol specification (Release 15); Jun. 2019; 519 pages.

* cited by examiner

*Primary Examiner* — Jinsong Hu
*Assistant Examiner* — Farideh Madani
(74) *Attorney, Agent, or Firm* — Alliance IP, LLC

(57) ABSTRACT

An apparatus of a Radio Access Network (RAN) node, a system, and a method. The apparatus includes one or more processors to generate a conditional handover (CHO) execution message to a user equipment (UE), the CHO execution message including a plurality of execution conditions to trigger execution of a handover (HO) of the UE from the RAN node to a target RAN node; and causing transmission of the CHO execution message to the UE.

14 Claims, 10 Drawing Sheets

APPARATUS, SYSTEM AND METHOD TO SIGNAL AND EXECUTE CONDITIONAL HANDOVER IN A CELLULAR NETWORK

CROSS REFERENCE TO RELATED APPLICATIONS

This application claims the benefit of and priority from U.S. Provisional Patent Application No. 62/887,548 entitled "SIGNALING AND EXECUTING CONDITIONAL HANDOVER," filed Aug. 15, 2019, the entire disclosure of which is incorporated herein by reference.

FIELD

Various embodiments generally relate to the field of cellular communications, and particularly to handovers.

BACKGROUND

Current Third Generation Partnership Project (3GPP) Radio (NR) specifications (or 5G specifications) do not specifically address issues related to failed handover attempts with conditional handovers.

DETAILED DESCRIPTION

Figure 1:
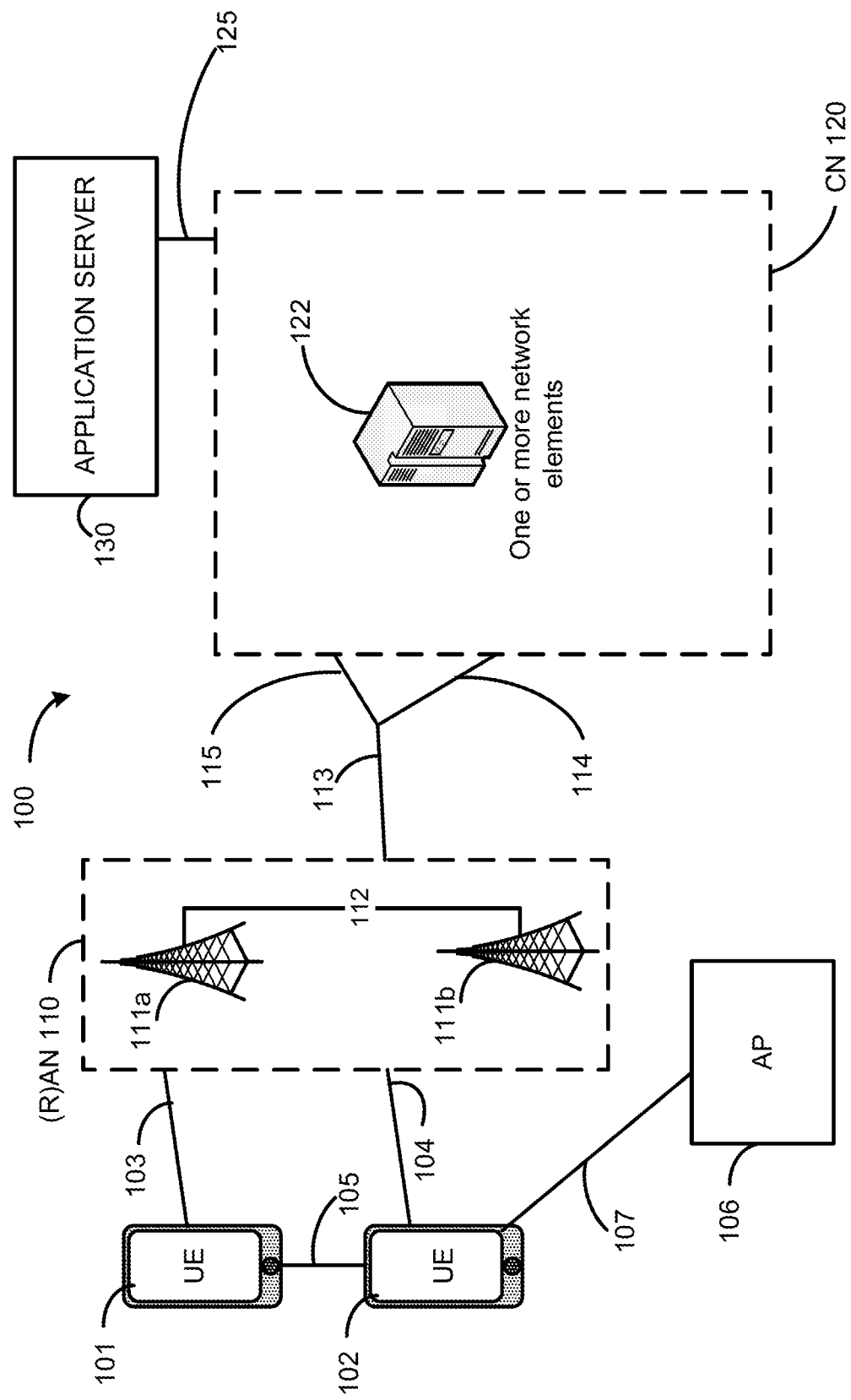
FIG. 1 illustrates an example architecture of a system of a network, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In legacy handovers, the network configures a measurement event to the user equipment (UE), based on which the UE performs measurements to send to a neighboring cell. For conditional handovers (HOs), when an event condition is met, the UE will start a time to trigger (TTT) timer. When the TTT expires, the UE will send a measurement report to the network/the NodeB. The NodeB, once it receives the measurement report, will launch the HO. In doing so, the NodeB will send a radio resource control (RRC) message to the UE including a HO command, and the UE will disconnect from the service cell, the existing NodeB, and will switch access to the target cell, at which time the UE would have completely finalized HO.

For a conditional HO, the NodeB may configure a more relaxed measurement event to the UE than in the case of a non-conditional HO. The NodeB may send a conditional configuration message to the UE to tell the UE to perform measurements continuously and if one of the conditional configuration conditions configured in the conditional configuration message is met, then, for the UE to perform the conditional execution of HO. Conditional execution is effectively a HO but procedurally different from a regular HO where conditions are not specified by the NodeB to the UE. Conditional HO allows the UE to perform the HO at a time that has met a configuration condition. A reason for conditional HO is that, traditionally, HO failure is due to a failure of the delivery of the HO command from the NodeB to the UE after the UE sends the measurement report to the NodeB. By the time of a measurement report, the serving cell signal may already be weak, and the UE may already be moving away. However, the signal for the target cell is typically much stronger. As a result, the signal degrades and HO command failure may occurs in a majority of cases. A conditional HO according to some embodiments triggers the HO command from the NodeB early on, that is, if the existing condition maps with one or more conditions configured by the NodeB to the UE. In such a case, the UE may disconnect from a serving cell and does not need to rely on a HO command from the serving cell, in this way improving HO failure.

According to some embodiments, the UE is configured to send the measurement report to the NodeB sooner than in the legacy case, so that the NodeB can configure a conditional HO message to the UE at that time, noting that the conditional configuration HO message from the NodeB to the UE is not the same as a HO command from the NodeB to the UE.

Some New Radio (NR)/Long Term Evolution (LTE) mobility enhancements have considered conditional handovers in order to improve the robustness and performance during HO. When a UE (e.g., UE 101 of FIG. 1) receives the conditional HO command, it may not execute it immediately. Similar to a measurement report triggering condition, a new triggering condition can be defined for conditional HO. In the RAN2#106 meeting, it was agreed that a conditional HO (CHO) execution condition like a A3/A5 CHO execution condition may be defined. The measurement event here can be configured by a gNodeB based on which the UE may start TTT. CHO according to embodiments includes mechanisms to determine not only when to trigger a measurement report by the UE to the NodeB, upon which the NodeB can send a radio resource control (RRC) message to the UE to start TTT, but also the HO execution condition, also configured from the NodeB to the UE, in terms of when the HO itself is going to be triggered Some embodiments provide a new configuration from the gNodeB to the UE for when the UE will perform a continuous measurement, and if a condition is met, start TTT, and once TTT has run out, execute the CHO. Whether to introduce multiple triggering conditions and whether to introduce time to trigger (TTT) are further contemplated.

Some embodiments provide mechanisms for execution of the conditional handover to enhance the robustness and signaling details for the conditional handover.

According to some embodiments, the gNodeB may send a RRC message including a CHO configuration after a measurement report from the UE based on a measurement event configuration message. Thus, after the UE sends the measurement report, the gNodeB may configure the conditional execution configuration to the UE. However, according to some embodiments, the gNodeB may send this conditional execution configuration without a measurement report from the UE.

According to Option 3, a new ID may be used for events with multiple quantities.

According to Option 4, the gNodeB may indicating only an event ID in the CHO command.

The above four options will be addressed in more detail below.

Option 1: Signal Multiple EventTriggerConfig for Multiple Quantities in CHO Command According to Option 1, the triggering condition may be configured by the legacy information element IE EventTriggerConfig for one triggering event using ReportConfigNR IE. If multiple triggering events are to be configured, the gNodeB may configure multiple ReportConfigNR IEs for different events (e.g., for A3 and A5). This can be signaled in a conditional HO command together with the RRC reconfiguration message provided by the target for the given candidate cell. An example of providing the execution condition is shown below.

CHOExecutionCond IE (Option 1)

```
CHOExecutionCond-r16::= SEQUENCE {
    triggerEvent-r16 SEQUENCE {
        choEventTriggered1-r16         EventTriggerConfig,
        choEventTriggered2-r16         EventTriggerConfig OPTIONAL, -- Need R
        ...
    } -- Need M
    nonCriticalExtension SEQUENCE { } OPTIONAL
}
```

In this case, a new even A7 event may be defined for CHO by extending the EventTriggerConfig as shown below.

EventTriggerConfig IE (Option1)

```
EventTriggerConfig::=       SEQUENCE {
    eventId                 CHOICE {
        eventA1             SEQUENCE {
            a1-Threshold        MeasTriggerQuantity,
            reportOnLeave       BOOLEAN,
            hysteresis          Hysteresis,
            timeToTrigger       TimeToTrigger
        },
        eventA2             SEQUENCE {
            a2-Threshold        MeasTriggerQuantity,
            reportOnLeave       BOOLEAN,
            hysteresis          Hysteresis,
            timeToTrigger       TimeToTrigger
        },
        eventA3             SEQUENCE {
            a3-Offset           MeasTriggerQuantityOffset,
            reportOnLeave       BOOLEAN,
            hysteresis          Hysteresis,
            timeToTrigger       TimeToTrigger,
            useWhiteCellList    BOOLEAN
        },
        eventA4             SEQUENCE {
            a4-Threshold        MeasTriggerQuantity,
            reportOnLeave       BOOLEAN,
            hysteresis          Hysteresis,
            timeToTrigger       TimeToTrigger,
            useWhiteCellList    BOOLEAN
        },
        eventA5             SEQUENCE {
            a5-Threshold1       MeasTriggerQuantity,
            a5-Threshold2       MeasTriggerQuantity,
            reportOnLeave       BOOLEAN,
            hysteresis          Hysteresis,
            timeToTrigger       TimeToTrigger,
            useWhiteCellList    BOOLEAN
        },
```

Embodiment #1: Multiple Triggering Events

In legacy HO, there was only one configuration or trigger quantity for the UE to start a measurement report. According to some embodiments, multiple such triggering events may be provided.

Regarding multiple quantities, for a legacy handover, the gNodeB can only configure different events for different trigger quantities, and the gNodeB can get measurement results based on different quantities from the UE measurement reporting. The gNodeB can select a target cell properly based on multiple measurement quantities, even if we do not support multiple quantities in the same measurement trigger condition.

However for the CHO execution condition, the decision regarding the time for execution is made by UE itself based on the condition configured by the network. If only one quantity is considered in the CHO execution condition, the target cell may not be the best one and HO failure or a ping-pong effect may take place. Therefore there is a benefit to letting the UE consider different trigger quantities in order to make a more robust CHO decision.

To support a multiple quantities based execution condition for the triggering of a CHO execution, some embodiments provide multiple options as noted below.

According to Option 1, the gNodeB B may Signal multiple EventTriggerConfig for multiple quantities in the CHO command.

According to Option 2, a new choEventTriggerConfig-r16 may be defined, and the gNodeB may signal multiple choEventTriggerConfig-r16 for multiple quantities in the CHO command.

| EventTriggerConfig IE (Option1) | |
|---|---|
| eventA6 | SEQUENCE { |
| a6-Offset | MeasTriggerQuantityOffset, |
| reportOnLeave | BOOLEAN, |
| hysteresis | Hysteresis, |
| timeToTrigger | TimeToTrigger, |
| useWhiteCellList | BOOLEAN |
| }, | |
| ... | |
| [[ | |
| eventA7-r16 | SEQUENCE { |
| a3-Offset | MeasTriggerQuantityOffset, |
| hysteresis | Hysteresis, |
| a5-Threshold1 | MeasTriggerQuantity, |
| a5-Threshold2 | MeasTriggerQuantity, |
| timeToTrigger | TimeToTrigger, |
| } | |
| ]] | |
| }, | |

Option 2: Define New EventTriggerConfig-r16 and Signal Multiple EventTriggerConfig-r16 for Multiple Quantities in CHO Command According to Option 2, a first alternative may provide a new IE EventTriggerConfig-r16 defined to contains only the applicable parameters for CHO entering condition, leaving condition and TTT. Similar to Option 1, the EventTriggerConfig-r16 may configure only one event and for multiple events triggering, multiple EventTriggerConfig-r16 IEs may be signaled.

CHOExecutionCond IE (Option 2)

```
CHOExecutionCond-r16::= SEQUENCE {
triggerEvent-r16 SEQUENCE {
        choEventTriggered1-r16          EventTriggerConfig-r16,
        choEventTriggered2-r16          EventTriggerConfig-r16 OPTIONAL, -- Need R
    ...
    } -- Need M
nonCriticalExtension SEQUENCE { }   OPTIONAL
}
EventTriggerConfig-r16::= SEQUENCE {
eventId-r16                         CHOICE {
    eventA3-r16                         SEQUENCE {
        a3-Offset                           MeasTriggerQuantityOffset,
        timeToTrigger                       TimeToTrigger,
            measReportQuantity-r16              MeasReportQuantity
    },
    eventA5-r16                         SEQUENCE {
        a5-Threshold1                       MeasTriggerQuantity,
        a5-Threshold2                       MeasTriggerQuantity,
        timeToTrigger                       TimeToTrigger,
            measReportQuantity-r16              MeasReportQuantity
    },
    ...
    }
}
MeasReportQuantity ::=              SEQUENCE {
    rsrp                                BOOLEAN,
    rsrq                                BOOLEAN,
    sinr                                BOOLEAN
}
```

According to Option 2, a second alternative may provide for the EventTriggerConfig-r16 to itself configure one or more triggering events. Thus, the EventTriggerConfig-r16 may configure multiple triggering events instead of one (as for the first alternative described above).

According to an example of Option 2, the EventTriggerConfig-r16 may further provide information about the TTT, where a measurement ID may include the TTT.

EventTriggerConfig IE (Option 2)

```
EventTriggerConfig-r16::= SEQUENCE (SIZE (1..maxEventId)) OF CHOeventId-r16
CHOeventId-r16                      CHOICE {
    eventA3-r16                         SEQUENCE {
        a3-Offset                           MeasTriggerQuantityOffset,
        timeToTrigger                       TimeToTrigger,
            measReportQuantity-r16              MeasReportQuantity
```

| EventTriggerConfig IE (Option 2) |
| --- |
| },<br>eventA5-r16        SEQUENCE {<br> a5-Threshold1       MeasTriggerQuantity,<br> a5-Threshold2       MeasTriggerQuantity,<br> timeToTrigger        TimeToTrigger<br>  measReportQuantity-r16    MeasReportQuantity<br>},<br>  ...<br>} |

In this case, the triggering event IDs are signaled together with the RRC reconfiguration message provided by the target for each candidate cell.

| CHOCandidateToAdd IE (Option 2) |
| --- |
| CHOCandidateToAdd-r16 ::=  SEQUENCE {<br> choID-r16         INTEGER<br>(1..maxCHOcells-r16),<br> eventTriggerConfig-r16    EventTriggerConfig-r16<br>  OPTIONAL, -- Need M<br> choConfiguration-r16  OCTET STRING (CONTAINING RRCReconfiguration)<br>  OPTIONAL -- Need M<br>} |

Option 3: Introduce New ID for Events with Multiple Quantities

According to Option 3, a new event may be defined to configure the multiple event trigger. An example is shown below.

| CHOCandidateToAdd IE (Option 3) |
| --- |
| CHOCandidateToAdd-r16 ::=   SEQUENCE {<br> choID-r16         INTEGER (1..maxCHOcells-r16),<br> choTriggerConfig-r16     CHOTriggerConfig-r16  OPTIONAL, -- Need M<br> choConfiguration-r16     OCTET STRING (CONTAINING RRCReconfiguration)<br> OPTIONAL -- Need M<br>}<br>CHOTriggerConfig-r16::= SEQUENCE {<br>eventId-r16        CHOICE {<br> choEventA3-r16      SEQUENCE {<br>  a3-Offset-r16      MeasTriggerQuantityOffset,<br>  timeToTrigger-r16     TimeToTrigger,<br>   measReportQuantity-r16    MeasReportQuantity<br>},<br> choEventA5-r16      SEQUENCE {<br>  a5-Threshold1-r16     MeasTriggerQuantity,<br>  a5-Threshold2-r16     MeasTriggerQuantity,<br>  timeToTrigger-r16     TimeToTrigger,<br>   measReportQuantity-r16    MeasReportQuantity<br>},<br>  choEventA3A5-r16     SEQUENCE {<br>  a3-Offset-r16      MeasTriggerQuantityOffset<br>   measReportQuantity-A3-r16    MeasReportQuantity,<br>   a5-Threshold1-r16    MeasTriggerQuantity,<br>  a5-Threshold2-r16     MeasTriggerQuantity,<br>   measReportQuantity-A5-r16    MeasReportQuantity<br>  timeToTrigger-r16     TimeToTrigger,<br>  },<br>  ...<br>}<br>} |

Option 4: Indicating Only Event ID in the CHO Command

According to Option 4, the trigger events (e.g., A3 and A5) and reporting quantity are configured by the legacy ReportConfigNR IE when measurement reporting is configured. The gNodeB may therefore indicate an identity of the event to be used for conditional handover in a CHO command. An example is shown below.

| CHOCandidateToAdd IE (Option 4) |
| --- |
| CHOCandidateToAdd-r16 ::=      SEQUENCE {<br>   choID-r16                              INTEGER (1..maxCHOcells-r16),<br>   eventTriggerConfig-r16                 ENUMERATED {eventA3, eventA5, eventA3andA5, spare1},<br>      OPTIONAL,   -- Need M<br>   choConfiguration-r16         OCTET STRING (CONTAINING RRCReconfiguration)<br>      OPTIONAL   -- Need M<br>} |

For example, if eventTriggerConfig-r16 indicates "eventA3andA5" or "A7", the conditions configured for both evenA3 and eventA5 apply. A new A7 event including multiple entering and leaving conditions may be defined for this purpose, for example, as shown in Option 1 above. To execute CHO for the candidate cell, a UE may therefore have to satisfy the entering conditions of both eventA3 and eventA5 that were configured for measurement reporting. Obviously, the parameters that are not applicable (e.g., reportOnLeave) are ignored for conditional HO triggering condition.

Additionally timeToTrigger-r16 may also be defined which overrides the timeToTrigger defined by the legacy IE eventTriggerConfig for each event (i.e., delta signaling with respect to the legacy parameter configured for measurement report). Similarly the reporting quantity can be defined to override the legacy MeasReportQuantity defined by the legacy ReportConfigNR IE.

Also, the new report quantity can also be signaled to override the report quantity defined by the legacy IE eventTriggerConfig. If the new parameters are not signaled in the CHO command, the parameters defined for measurement report may be reused.

offset of the neighbor cell can also be reused or may be signaled differently for the CHO to be used to determine the entering and leaving condition. The delta signaling for those parameters may be performed in conditional handover command.

For a CHO trigger, the gNodeB may configure reference signal receiver power (RSRP), reference signal received quality (RSRQ) or signal to noise and interference ratio (SINR) as a trigger quantity. Reporting quantities can be any combination of quantities (i.e. only RSRP; only RSRQ; only SINR; RSRP and RSRQ; RSRP and SINR; RSRQ and SINR; RSRP, RSRQ and SINR), irrespective of the trigger quantity.

Separate events for the CHO can also be defined as A7 (legacy A5 and A7 for CHO), A8 (Legacy A3 for CHO) and A9 (legacy A5 for CHO). For example A7 for two events A3 and A5.

According to some embodiments, for A7 (Neighbour becomes offset better than SpCell and SpCell becomes worse than threshold1 and neighbour becomes better than threshold2):

The UE shall:

1> consider the entering condition for this event to be satisfied when all condition A7-1, condition A7-2 and condition A7-3, as specified below, are fulfilled;

1> consider the leaving condition for this event to be satisfied when condition A7-4, or condition A7-5 or condition A7-6, i.e. at least one of the three, as specified below, is fulfilled;

1> use the SpCell for Mp, Ofp and Ocp.

| CHOCandidateToAdd IE (Option 4) | | |
| --- | --- | --- |
| CHOCandidateToAdd-r16 ::=      SEQUENCE { | | |
|    choID-r16 | | INTEGER (1..maxCHOcells-r16), |
|    eventTriggerConfig-r16 | | ENUMERATED {eventA3, eventA5, eventA3andA5, spare1}, |
|       OPTIONAL, | -- Need M | |
|    timeToTrigger-r16 | TimeToTrigger  OPTIONAL, | -- Need M |
|      a3-Offset-16 | MeasTriggerQuantityOffset OPTIONAL, | -- Need M |
|      a5-Threshold1-r16 | MeasTriggerQuantity OPTIONAL, | -- Need M |
|    a5-Threshold2-r16 | MeasTriggerQuantity OPTIONAL, | -- Need M |
|    measReportQuantity-r16 | MeasReportQuantity OPTIONAL, | -- Need M |
|    choConfiguration-r16 | OCTET STRING (CONTAINING RRCReconfiguration) | |
| RRCReconfiguration) | OPTIONAL,   -- Need M | |
|    ... | | |
| } | | |

Embodiment #2: Meeting the Execution Condition with Multiple Triggering Events

For CHO, the same entering and leaving conditions defined for the legacy events configured for the measurement reporting can be re-used. The parameters such as offset or thresholds, hysteresis, the measurement object specific NOTE The cell(s) that triggers the event has reference signals indicated in the measObjectNR associated to this event which may be different from the NR SpCell measObjectNR.

$Mn + Ofn + Ocn - Hys > Mp + Ofp + Ocp + Off$     Inequality A7-1 (Entering condition 1)

$Mp + Hys < Thresh1$     Inequality A7-2 (Entering condition 2)

$Mn+Ofn+Ocn-Hys>Thresh2$  Inequality A7-3 (Entering condition 3)

$Mn+Ofn+Ocn+Hys<Mp+Ofp+Ocp+Off$  Inequality A7-4 (Leaving condition 1)

$Mp-Hys>Thresh1$  Inequality A7-5 (Leaving condition 2)

$Mn+Ofn+Ocn+Hys<Thresh2$  Inequality A7-6 (Leaving condition 3)

The variables in the formula are defined as follows:

Mn is the measurement result of the neighbouring cell, not taking into account any offsets.

Ofn is the measurement object specific offset of the reference signal of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the frequency of the neighbour cell), and set to zero if not configured for the neighbour cell.

Mp is the measurement result of the SpCell, not taking into account any offsets.

Ofp is the measurement object specific offset of the SpCell (i.e. offsetMO as defined within measObjectNR corresponding to the SpCell).

Ocp is the cell specific offset of the SpCell (i.e. cellIndividualOffset as defined within measObjectNR corresponding to the SpCell), and is set to zero if not configured for the SpCell.

Hys is the hysteresis parameter for this event (i.e. hysteresis-r16 as defined within RRC reconfiguration message for CHO for this event, if hysteresis-r16 is not present, hysteresis as defined within reportConfigNR for this event).

Off is the offset parameter for this event (i.e. a3-Offset-r16 as defined within RRC reconfiguration message for CHO for this event, if a3-Offset-r16 is not present, a3-Offset as defined within reportConfigNR for this event).

Thresh1 is the threshold parameter for this event (i.e. a5-Threshold1-r16 as defined within RRC reconfiguration message for CHO for this event. If a5-Threshold1-r16 is not present, a5-Threshold1 as defined within reportConfigNR for this event).

Thresh2 is the threshold parameter for this event (i.e. a5-Threshold2-r16 as defined within RRC reconfiguration message for CHO for this event, if a5-Threshold2-r16 is not present, a5-Threshold2 as defined within reportConfigNR for this event).

Mn, Mp are expressed in dBm in case of RSRP, or in dB in case of RSRQ and RS-SINR.

Ofn, Ocn, Ofp, Ocp, Hys, Off are expressed in dB.

When a UE is configured with only a single event (e.g., A3), for example, the UE may simply trigger the TTT timer once the entering condition is satisfied. When the TTT timer expires and the UE does not satisfy the leaving condition, the UE can execute the conditional handover. Setting a value of timer TTT to zero is equivalent to not configuring or using the timer TTT for CHO. However, when multiple events are configured, for example event A3 and A5 or multiple entering and leaving conditions corresponding to multiple events are configured, there can be several options to consider, as noted below.

Option #1: A Common Timer TTT is Used for the Events or the Entering/Leaving Conditions.

According to one embodiment, if a UE meets the entering condition of the event 1, then it may start the timer TTT and at the same time check the entering condition of event 2 or other events. If the UE also meets the entering condition of the event 2, then in one option, the UE may continue the timer TTT or restart the timer TTT. When timer TTT expires and a leaving condition of the events is not met, then the UE may execute the CHO.

While TTT is running, if any one of the event meets the leaving condition, the UE may continue the timer running if other event(s) is/are still not meeting the leaving condition. If the timer TTT expires, and any of the events have already met the leaving condition, then the UE may not execute the CHO and may revaluate the entering condition of all the events to restart the timer TTT.

In another option, the timer TTT may be started only when all the configured entering conditions are met, e.g., eventA3andA5 or A7. If any leaving condition is met then the timer TTT may be stopped. The CHO may be executed if the timer TTT expires.

Option #2: A Separate Timer is Used for Each Event or Entering/Leaving Conditions Associated with Different Events According to a second option, each event may be configured with a same or a different value of timer TTT. To execute the CHO, each event meets the entering condition and does not leave when the corresponding timer expires. When timer TTT expires for an event 1, then the timer TTT for event 2 may still be running. The CHO is executed only if all TTT timers are expired.

In one option, even multiple timers are running, the CHO is executed if all events meet the entering condition until any one of the timers expires or until the timer TTT with longer length expires.

Option #3: No Timer is Used for the Events

In this option, a timer is not used. If a UE meets the entering condition of the multiple events at the same time, a UE can execute the CHO. If UE meets the entering condition of one event, then to execute the CHO, it has to keep meeting the entering condition of that event until then entering condition of another event is met.

Embodiment #3: Signaling Details for Inter-Node RRC Message

An inter-node RRC message can be used to send the RRC reconfiguration container and candidate cell ID from target to source. This message can also be used to release the resource or CHO command initiated by target in which case the inter-node RRC message only includes the candidate cell ID. However, for release, Xn (or X2 in LTE), the message can be used with the possibility of indicating the ID of the candidate cell for which CHO is released.

Option #1: List of Containers for RRC Reconfiguration Message

Option 1 of the third embodiment may provide as follows below:

Message Definitions

HandoverCommand

This message is used to transfer the handover command as generated by the target gNB.

Direction: target gNB to source gNB/source RAN.

| HandoverCommand message |
|---|

```
-- ASN1START
-- TAG-HANDOVER-COMMAND-START
HandoverCommand ::=           SEQUENCE {
  criticalExtensions          CHOICE {
    c1                        CHOICE{
      handoverCommand               HandoverCommand-IEs,
      spare3 NULL, HandoverCommand-r16 HandoverCommand-r16-IEs
         spare2 NULL, spare1 NULL
    },
    criticalExtensionsFuture  SEQUENCE { }
  }
}
HandoverCommand-IEs ::=       SEQUENCE {
  handoverCommandMessage          OCTET STRING (CONTAINING
                                  RRCReconfiguration),
  nonCriticalExtension        SEQUENCE { }     OPTIONAL
}
HandoverCommand-r16-IEs ::=   SEQUENCE {
      handoverCommandMessage-r16              CHO-ContainerList-r16,
      nonCriticalExtension    SEQUENCE { }     OPTIONAL
}
-- TAG-HANDOVER-COMMAND-STOP
-- ASN1STOP
```

| HandoverCommand field descriptions |
|---|
| handoverCommandMessage<br>Contains the RRCReconfiguration message used to perform handover within NR or handover to NR, as generated (entirely) by the target gNB. |

CHO-ContainerList

The IE CHO-ContainerList contains list of containers for configuration of candidate cell(s).

| CHO-ContainerList information element |
|---|

```
-- ASN1START
-- TAG-CHO-CONTAINERLIST-START
CHO-ContainerList-r16::=SEQUENCE (SIZE (1. maxCHOcells-r16))
OF CHO-Container-r16
CHO-Container-r16::= SEQUENCE {
    candidateCell-ID-r16  PhysCellId,
    conditionalhandoverCommandMessage-r16   OCTET STRING (CONTAINING
RRCReconfiguration)
}
-- TAG-CHO-CONTAINERLIST-STOP
-- ASN1STOP
```

Option #2: A Container for RRC Reconfiguration Message

In this Option 2 of the third embodiment, if the target node has multiple candidate cells, it provides the handover command to the source as separate inter node RRC message as noted below:

Message Definitions

HandoverCommand

This message is used to transfer the handover command as generated by the target gNB.

Direction: target gNB to source gNB/source RAN.

| HandoverCommand message |
|---|

```
-- ASN1START
-- TAG-HANDOVER-COMMAND-START
HandoverCommand ::=           SEQUENCE {
  criticalExtensions          CHOICE {
    c1                        CHOICE{
      handoverCommand               HandoverCommand-IEs,
```

| HandoverCommand message |
| --- |
| <pre>        spare3NULL,  HandoverCommand-r16 HandoverCommand-r16-IEs
            spare2 NULL, spare1 NULL
    },
    criticalExtensionsFuture        SEQUENCE { }
    }
}
HandoverCommand-IEs ::=          SEQUENCE {
    handoverCommandMessage       OCTET STRING (CONTAINING RRCReconfiguration),
    nonCriticalExtension         SEQUENCE { }             OPTIONAL
}
HandoverCommand-r16-IEs ::=      SEQUENCE {
    handoverCommandMessage-r16                            SEQUENCE {
        candidateCell-ID-r16 PhysCellId,
        choCommandMessage-r16 OCTET STRING (CONTAINING
RRCReconfiguration) OPTIONAL,   -- Need OR
    }                            OPTIONAL,   -- Need M
    nonCriticalExtension         SEQUENCE { }             OPTIONAL
}
-- TAG-HANDOVER-COMMAND-STOP
-- ASN1STOP</pre> |

| HandoverCommand field descriptions |
| --- |
| handoverCommandMessage<br>Contains the RRCReconfiguration message used to perform handover within NR or handover to NR, as generated (entirely) by the target gNB. |

Embodiment #4: Signaling Details for RAN RRC Message

Option #1: Critical Extension of the RRC Reconfiguration Message

According to Option 1 of the fourth embodiment, the RRCReconfiguration message, the command to modify an RRC connection, may convey information for measurement configuration, mobility control, radio resource configuration (including RBs, MAC main configuration and physical channel configuration) and AS security configuration as noted below:

Signalling radio bearer: SRB1 or SRB3
RLC-SAP: AM
Logical channel: DCCH
Direction: Network to UE

| RRCReconfiguration message |
| --- |
| <pre>-- ASN1START
-- TAG-RRCRECONFIGURATION-START
RRCReconfiguration ::=           SEQUENCE {
    rrc-TransactionIdentifier    RRC-TransactionIdentifier,
    criticalExtensions           CHOICE {
        rrcReconfiguration       RRCReconfiguration-IEs,
        criticalExtensionsFuturec1   SEQUENCE { CHOICE {
        rrcReconfiguration-r16       RRCReconfiguration-r16-IEs,
        criticalExtensionsFuture-r16 SEQUENCE { }
        }
    }
}
RRCReconfiguration-IEs ::=       SEQUENCE {
    radioBearerConfig            RadioBearerConfig          OPTIONAL, -- Need M
    secondaryCellGroup           OCTET STRING (CONTAINING CellGroupConfig)
OPTIONAL, -- Need M
    measConfig                   MeasConfig                 OPTIONAL, -- Need M
    lateNonCriticalExtension     OCTET STRING               OPTIONAL,
    nonCriticalExtension         RRCReconfiguration-v1530-IEs</pre> |

-continued

| RRCReconfiguration message |
|---|

```
OPTIONAL
}
RRCReconfiguration-v1530-IEs ::=        SEQUENCE {
    masterCellGroup            OCTET STRING (CONTAINING CellGroupConfig)
OPTIONAL, -- Need M
    fullConfig                 ENUMERATED {true}              OPTIONAL, --
Cond FullConfig
    dedicatedNAS-MessageList           SEQUENCE (SIZE(1..maxDRB)) OF DedicatedNAS-Message
OPTIONAL, -- Cond nonHO
    masterKeyUpdate            MasterKeyUpdate               OPTIONAL, -
- Cond MasterKeyChange
    dedicatedSIB1-Delivery         OCTET STRING (CONTAINING SIB1)
OPTIONAL, -- Need N
    dedicatedSystemInformationDelivery      OCTET STRING (CONTAINING SystemInformation)
OPTIONAL, -- Need N
    otherConfig                OtherConfig                OPTIONAL, -- Need
M
    nonCriticalExtension           RRCReconfiguration-v1540-IEs
OPTIONAL
}
RRCReconfiguration-v1540-Es ::=         SEQUENCE {
    otherConfig-v1540          OtherConfig-v1540    OPTIONAL, -- Need M
    nonCriticalExtension           RRCReconfiguration-v1560-IEs   OPTIONAL
}
RRCReconfiguration-v1560-Es ::=         SEQUENCE {
    mrdc-SecondaryCellGroupConfig          SetupRelease { MRDC-SecondaryCellGroupConfig }
OPTIONAL, -- Need M
    radioBearerConfig2         OCTET STRING (CONTAINING RadioBearerConfig)
OPTIONAL, -- Need M
    sk-Counter                 SK-Counter                 OPTIONAL, -- Need
N
    nonCriticalExtension           SEQUENCE { }              OPTIONAL
}
MRDC-SecondaryCellGroupConfig ::=   SEQUENCE {
    mrdc-ReleaseAndAdd         ENUMERATED {true}
OPTIONAL, -- Need N
    mrdc-SecondaryCellGroup            CHOICE {
        nr-SCG                 OCTET STRING (CONTAINING RRCReconfiguration),
        eutra-SCG              OCTET STRING
    }
}
MasterKeyUpdate ::=            SEQUENCE {
    keySetChangeIndicator          BOOLEAN,
    nextHopChainingCount           NextHopChainingCount,
    nas-Container              OCTET STRING              OPTIONAL, -- Cond
securityNASC
    ...
}
RRCReconfiguration-r16-IEs ::= SEQUENCE {
        choConfiguration-r16              SEQUENCE {
            choCandidateToReleaseList-r16         CHOCandidateToReleaseList-r16
        OPTIONAL,   -- Need M
            choCandidateToAddList-r16             CHOCandidateToAddList-r16
        OPTIONAL    -- Need M
        }       OPTIONAL,   -- Need M
        nonCriticalExtension            SEQUENCE { }
        OPTIONAL
}
CHOCandidateToReleaseList-r16 ::= SEQUENCE (SIZE (1..maxCHOcells-r16)) OF
CHOCandidateToRelease-r16
CHOCandidateToAddList-r16 ::= SEQUENCE (SIZE (1..maxCHOcells-r16)) OF
CHOCandidateToAdd-r16
CHOCandidateToAdd-r16::=              SEQUENCE {
        choID-r16                           INTEGER
(1..maxCHOcells-r16),
        choExecutionCond-r16                          CHOExecutionCond-r16
            OPTIONAL,        -- Need M
        choConfiguration-r16           OCTET STRING (CONTAINING RRCReconfiguration)
            OPTIONAL         -- Need M
}
CHOCandidateToRelease-r16::=          SEQUENCE {
    choID-r16                           INTEGER
(1..maxCHOcells-r16)
}
CHOExecutionCond-r16::=   SEQUENCE {
triggerEvent-r16 SEQUENCE {
    eventTriggered1-r16            CHOTriggerConfig-r16,
```

| RRCReconfiguration message |
| --- |
| eventTriggered2-r16                    CHOTriggerConfig-r16 OPTIONAL, -- Need R<br>...<br>} -- Need M<br>nonCriticalExtension SEQUENCE { }   OPTIONAL<br>}<br>CHOTriggerConfig-r16::= SEQUENCE {<br>eventId                                 CHOICE {<br>   eventA3                              SEQUENCE {<br>     a3-Offset                           MeasTriggerQuantityOffset,<br>     timeToTrigger                       TimeToTrigger<br>   },<br>   eventA5                              SEQUENCE {<br>     a5-Threshold1                       MeasTriggerQuantity,<br>     a5-Threshold2                       MeasTriggerQuantity,<br>     timeToTrigger                       TimeToTrigger<br>   },<br>   ...<br>   }<br>}<br>-- TAG-RRCRECONFIGURATION-STOP<br>-- ASN1STOP |

Option #2: Non-Critical Extension of the RRC Reconfiguration Message

According to Option 2 of the fourth embodiment, the RRCReconfiguration message may include a non-critical extension as noted below:

```
RRCReconfiguration-v1560-IEs ::=             SEQUENCE {
    mrdc-SecondaryCellGroupConfig                SetupRelease { MRDC-SecondaryCellGroupConfig }
OPTIONAL, -- Need M
    radioBearerConfig2                           OCTET STRING (CONTAINING RadioBearerConfig)
OPTIONAL, -- Need M
    sk-Counter                           SK-Counter             OPTIONAL, -- Need
N
    nonCriticalExtension                 SEQUENCE {} RRCReconfiguration-v16xy-IEs
OPTIONAL
}
RRCReconfiguration-v16xy-IEs::= SEQUENCE {
    choConfiguration-r16                       SEQUENCE {
        choCandidateToReleaseList-r16                CHOCandidateToReleaseList-r16
    OPTIONAL,  -- Need M
        choCanididateToAddList-r16                   CHOCandidateToAddList-r16
    OPTIONAL   -- Need M
    }     OPTIONAL,  -- Need M
    nonCriticalExtension                       SEQUENCE { }
OPTIONAL
}
```

Option #3: New RRC Message for CHO

According to Option 3 of the fourth embodiment, the DL-DCCH-Message class, that is the set of RRC messages that may be sent from the gNodeB to the UE on the downlink DCCH logical channel may be configured as follows below:

```
-- ASN1START
    -- TAG-DL-DCCH-MESSAGE-START
DL-DCCH-Message ::=         SEQUENCE {
    message                 DL-DCCH-MessageType
}
DL-DCCH-MessageType ::=     CHOICE {
    c1                          CHOICE {
        rrcReconfiguration          RRCReconfiguration,
        rrcResume                   RRCResume,
        rrcRelease                  RRCRelease,
        rrcReestablishment          RRCReestablishment,
        securityModeCommand             SecurityModeCommand,
        dlInformationTransfer           DLInformationTransfer,
        ueCapabilityEnquiry             UECapabilityEnquiry,
        counterCheck                    CounterCheck,
        mobilityFromNRCommand           MobilityFromNRCommand,
        spare7 NULL, choConfiguration-r16   CHOConfiguration-r16,
        spare6 NULL, spare5 NULL, spare4 NULL,
        spare3 NULL, spare2 NULL, spare1 NULL
    },
    messageClassExtension           SEQUENCE { }
}
-- TAG-DL-DCCH-MESSAGE-STOP
-- ASN1STOP
```

Referring still to Option 3 of the fourth embodiment, the CHOConfiguration message, that is, the conditional handover command to add, modify and remove an RRC con figuration of a candidate cell, may convey the container of RRCReconfiguration message provided by the target cell and execution condition added by the source cell as noted below:

Signalling radio bearer: SRB1 or SRB3
RLC-SAP: AM
Logical channel: DCCH
Direction: Network to UE

| CHOConfiguration message |
|---|
| ```
-- ASN1START
-- TAG-CHOCONFIGURATION-START
CHOConfiguration-r16::=            SEQUENCE {
    criticalExtensions                 CHOICE {
        choConfiguration-r16           CHOConfiguration-r16-IEs,
        criticalExtensionsFuture       SEQUENCE { }
    }
}
CHOConfiguration-r16-IEs::= SEQUENCE {
    choAddRelease-r16                  SEQUENCE {
        choCandidateToReleaseList-r16      CHOCandidateToReleaseList-r16
    OPTIONAL,   -- Need M
        choCandidateToAddList-r16          CHOCandidateToAddList-r16
    OPTIONAL,   -- Need M
    }   OPTIONAL,                      -- Need M
    nonCriticalExtension               SEQUENCE { }
    OPTIONAL
}
CHOCandidateToReleaseList-r16 ::= SEQUENCE (SIZE (1..maxCHOcells-r16)) OF CHOCandidateToRelease-r16
CHOCandidateToAddList-r16 ::=      SEQUENCE (SIZE (1..maxCHOcells-r16)) OF CHOCandidateToAdd-r16
CHOCandidateToAdd-r16 ::=          SEQUENCE {
    choID-r16                                                          INTEGER
(1..maxCHOcells-r16),
    choExecutionCond-r16                           CHOExecutionCond-r16
        OPTIONAL,                      -- Need M
    choConfiguration-r16               OCTET STRING (CONTAINING RRCReconfiguration)
        OPTIONAL -- Need M
}
CHOCandidateToRelease-r16 ::=      SEQUENCE {
    choID-r16                                                          INTEGER
(1..maxCHOcells-r16)
}
CHOExecutionCond-r16::= SEQUENCE {
triggerEvent-r16 SEQUENCE {
eventTriggered1-r16                CHOTriggerConfig-r16,
    eventTriggered2-r16              CHOTriggerConfig-r16 OPTIONAL, -- Need R
    ...
} -- Need M
nonCriticalExtension SEQUENCE { }      OPTIONAL
}
CHOTriggerConfig-r16::= SEQUENCE {
eventId-r16                        CHOICE {
    eventA3                         SEQUENCE {
    a3-Offset                       MeasTriggerQuantityOffset,
    timeToTrigger                   TimeToTrigger,
        measReportQuantity-r16                                         MeasReportQuantity
    },
    eventA5                         SEQUENCE {
    a5-Threshold1                   MeasTriggerQuantity,
    a5-Threshold2                   MeasTriggerQuantity,
    timeToTrigger                   TimeToTrigger,
        measReportQuantity-r16                                         MeasReportQuantity
    },
        ...
    }
}
-- TAG-CHOCONFIGURATION-STOP
-- ASN1STOP
    Exit condition of the Conditional handover
RRCReconfiguration-v1560-IEs::=    SEQUENCE {
    mrdc-SecondaryCellGroupConfig      SetupRelease { MRDC-SecondaryCellGroupConfig }
OPTIONAL, -- Need M
radioBearerConfig2                 OCTET STRING (CONTAINING RadioBearerConfig)
OPTIONAL, -- Need M
    sk-Counter                      SK-Counter                         OPTIONAL, -- Need N
    nonCriticalExtension            ~~SEQUENCE {~~ RRCReconfiguration-v16xy-IEs
OPTIONAL
}
RRCReconfiguration-v16xy-IEs::= SEQUENCE {
    choExitCondition-r16 CHOExitCondition-IEs-r16   OPTIONAL,   -- Need M
``` |

-continued

| CHOConfiguration message | |
| --- | --- |
| nonCriticalExtension OPTIONAL } | SEQUENCE { } |
| RRCReconfiguration-v1560-IEs::= | SEQUENCE { |
| choValidityTimer-r16 5000ms, 10000ms, infinity}, OPTIONAL, | ENUMERATED {50ms, 100ms, 200ms, 500ms, 1000ms, -- Need M |
| choExithThresh-r16 | MeasTriggerQuantity OPTIOINAL, -- Need M |
| nonCriticalExtension OPTIONAL } | SEQUENCE { } |

Cell Measurement and Cell Reselection

Radio Resource Control (RRC) includes a measurement configuration and reporting function that is used for establishment/modification/release of measurements (e.g. intra-frequency, inter-frequency, and inter-RAT measurements).

The gNodeB may configure an RRC_CONNECTED UE to perform measurements and report them in accordance with the measurement configuration. The measurement configuration is provided by means of dedicated signaling i.e. using the RRCReconfiguration. The gNodeB may configure the UE to perform NR measurements, and/or Inter-RAT measurements of E-UTRA frequencies. The gNodeB may configure the UE to report measurement information based on SS/PBCH block(s), including measurement results per SS/PBCH block; measurement results per cell based on SS/PBCH block(s); and/or SS/PBCH block(s) indexes. The gNodeB may configure the UE to report measurement information based on CSI-RS resources, including measurement results per CSI-RS resource; measurement results per cell based on CSI-RS resource(s); and/or CSI-RS resource measurement identifiers.

The measurement configuration includes the following parameters: measurement objects, reporting configurations, measurement identities, quantity configurations, and measurement gaps. The reporting configurations include lists of reporting configurations where there can be one or multiple reporting configurations per measurement object. Each reporting configuration includes a reporting criterion, reference signal (RS) type, and reporting format.

The measurement identities include list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

The quantity configuration defines the measurement filtering configuration used for all event evaluation and related reporting of that measurement type. For NR measurements, the gNodeB may configure up to 2 quantity configurations with a reference in the NR measurement object to the configuration that is to be used. In each configuration, different filter coefficients can be configured for different measurement quantities, for different RS types, and for measurements per cell and per beam. Measurement gaps are periods that the UE may use to perform measurements, i.e. no (UL, DL) transmissions are scheduled.

A measurement object is a list of objects on which the UE is to perform the measurements. For intra-frequency and inter-frequency measurements, a measurement object indicates the frequency/time location and subcarrier spacing of reference signals to be measured. Associated with this measurement object, the gNodeB may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting. The UE determines which MO corresponds to each serving cell frequency from the frequencyInfoDL in ServingCellConfigCommon within the serving cell configuration.

A UE in RRC_CONNECTED maintains a measurement object list, a reporting configuration list, and a measurement identities list according to signaling and procedures in a cellular specification. The measurement object list possibly includes NR intra-frequency object(s), NR inter-frequency object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

RRC also includes an RRC connection control function that is used for connection mobility including, e.g., intra-frequency and inter-frequency handover, associated security handling (e.g., key/algorithm change), and specification of RRC context information transferred between network nodes. The RRC connection control function may control or instruct a network node and/or UE to perform an RRC reconfiguration procedure. The purpose of the RRC reconfiguration procedure is to modify an RRC connection to establish/modify/release radio bearers (RBs), to perform reconfiguration with synchronization (sync), to setup/modify/release measurements, to add/modify/release SCells and cell groups. As part of the RRC reconfiguration procedure, NAS dedicated information may be transferred from the Network to the UE.

The gNodeB may initiate the RRC reconfiguration procedure to a UE in RRC_CONNECTED mode. The Network applies the procedure as follows: the establishment of RBs (other than SRB1, that is established during RRC connection establishment) is performed only when AS security has been activated; the addition of Secondary Cell Group and SCells is performed only when AS security has been activated; and the reconfigurationWithSync is included in secondaryCellGroup only when at least one DRB is setup in SCG.

MR-DC involves a multiple Rx/Tx UE configured to utilize radio resources provided by two distinct schedulers in two different nodes connected via non-ideal backhaul, one providing Evolved Universal Terrestrial Radio Access (E-UTRA) access and the other one providing NR access. One scheduler is located in a MN and the other in the Secondary Node (SN). The MN and SN are connected via a network interface and at least the MN is connected to the core network.

MR-DC includes EN-DC or NGEN-DC. In EN-DC, a UE may be connected to one eNB that acts as an MN and one gNB that acts as an SN. The eNB is connected to an EPC and the en-gNB is connected to the eNB via the X2 interface. The en-gNB is a node that provides NR user plane and control plane protocol terminations towards the UE, and acts as the SN in EN-DC. In NR-EN, a UE may be connected to one gNB that acts as the MN and one ng-eNB that acts as a SN. The gNB is connected to 5GC and the ng-eNB (Master Node eNB) is connected to the gNB via the Xn interface.

In the RRC_IDLE state, the cell reselection procedure allows the UE to select a more suitable cell and to camp on that cell. When the UE is in either Camped Normally state or Camped on Any Cell state on a cell, the UE shall attempt to detect, synchronise, and monitor intra-frequency, inter-frequency and inter-RAT cells indicated by the serving cell. For intra-frequency and inter-frequency cells the serving cell may not provide explicit neighbour list but carrier frequency information and bandwidth information only. UE measurement activity is also controlled by measurement rules defined in 3GPP TS 36.304, allowing the UE to limit its measurement activity. For idle mode cell re-selection purposes, the UE shall be capable of monitoring at least: Intra-frequency carrier, and depending on UE capability, NR inter-frequency carriers, depending on UE capability, FDD E-UTRA inter-RAT carriers, and depending on UE capability, TDD E-UTRA inter-RAT carriers. In addition to these requirements, a UE supporting E-UTRA measurements in RRC_IDLE state shall be capable of monitoring a total of at least carrier frequency layers, which includes serving layer, comprising of any above defined combination of E-UTRA FDD, E-UTRA TDD and NR layers.

In the RRC_IDLE state, the UE measures the SS-RSRP and SS-RSRQ level of the serving cell and evaluates the cell selection criterion S for the serving cell at least every DRX cycle. The UE filters the SS-RSRP and SS-RSRQ measurements of the serving cell using at least 2 measurements. Within the set of measurements used for the filtering, at least two measurements shall be spaced by, at least [DRX cycle/2]. If the UE has evaluated a number of DRX cycles $N_{serv}$ consecutive DRX cycles that the serving cell does not fulfil the cell selection criterion S, the UE initiates the measurements of all neighbour cells indicated by the serving cell, regardless of the measurement rules currently limiting UE measurement activities. If the UE in RRC_IDLE has not found any new suitable cell based on searches and measurements using the intra-frequency, inter-frequency and inter-RAT information, the UE initiates cell selection procedures for the selected PLMN.

Intra-Frequency Measurements

For intra-frequency NR cells, the UE identifies new intra-frequency cells and performs SS-RSRP and SS-RSRQ measurements of the identified intra-frequency cells without an explicit intra-frequency neighbour list containing physical layer cell identities. The UE evaluates whether a newly detectable intra-frequency cell meets the reselection criteria within $T_{detect,NR\_Intra}$ when that Treselection=0. An intra frequency cell is considered to be detectable according to a predefined or configured SS-RSRP, SS-RSRP Ês/Iot for a corresponding band. The UE measures SS-RSRP and SS-RSRQ at least every $T_{measure,NR\_Intra}$ for intra-frequency cells that are identified and measured according to the measurement rules, and filters SS-RSRP and SS-RSRQ measurements of each measured intra-frequency cell using at least 2 measurements. Within the set of measurements used for the filtering, at least two measurements shall be spaced by at least $T_{measure,NR\_Intra}/2$. If the $T_{reselection}$ timer has a non-zero value and the intra-frequency cell is better ranked than the serving cell, the UE evaluates the intra-frequency cell for the $T_{reselection}$ time, and if this cell remains better ranked within this duration, then the UE reselects to that cell.

A measurement is defined to be an SSB intra-frequency measurement provided the center frequency of the SSB of the serving cell indicated for measurement and the center frequency of the SSB of the neighbour cell are the same, and the subcarrier spacing of the two SSB are also the same. The UE can perform intra-frequency SSB based measurements without measurement gaps under the following conditions: the SSB is completely contained in the downlink operating bandwidth of the UE; the SSB has the same subcarrier spacing as the downlink data transmission to the UE; the UE is measuring on FR1; and the serving cell data transmissions to the UE have the same subcarrier spacing as the SSB to be measured.

SSB based measurements are configured along with one or two measurement timing configuration(s) (SMTC) which provides periodicity, duration and offset information on a window of up to 5 ms where the measurements are to be performed. For intra-frequency connected mode measurements, up to two measurement window periodicities may be configured. A single measurement window offset and measurement duration are configured per intra-frequency measurement object.

When measurement gaps are needed, the UE is not expected to detect SSBs that start earlier than the gap starting time+switching time, nor detect SSB which end later than the gap end−switching time. The switching time is 0.5 ms for FR1 and 0.25 ms for FR2.

The number of cell and number of SSB requirements for FR1 are as follows: For each intra-frequency layer, the UE is capable of monitoring at least 8 cells. For each intra-frequency layer, during each layer 1 measurement period, the UE shall be capable of monitoring at least SSBs with different SSB index and/or PCI on the intra-frequency layer, where the number of SSBs in the serving cell (except for the SCell) is no smaller than the number of configured RLM-RS SSB resources. The Reference Signal for RLM (RLM-RS) resource is a resource out of the set of resources configured for RLM by higher layer parameter RLM-RS-List.

The number of cell and number of SSB requirements for FR2 are as follows: For each intra-frequency layer the UE shall be capable of monitoring at least cells on a single serving carrier (PCC or PSCC or 1 SCC if PCC/PSCC is in a band different from SCC) out of all the serving carriers configured in the same band. For each intra-frequency layer, during each layer 1 measurement period, the UE shall be capable of monitoring at least SSB with different SSB index and/or PCI on a single serving carrier (PCC or PSCC or 1 SCC if PCC/PSCC is in a band different from SCC) out of all the serving carriers configured in the same band. UE shall be capable of monitoring [1~4] SSB(s) on serving cell for each of the other serving carrier(s) in the same band. UE shall be capable of performing RSRP and RSRQ on all above-mentioned SSBs.

Measurement reporting may be periodic or event-triggered periodic. The periodically triggered measurement report is to include RSRP, RSRQ, and RS-SINR measurements. The UE does not send any event triggered measurement reports, as long as no reporting criteria are fulfilled. A measurement reporting delay is defined as the time between an event that will trigger a measurement report and the point when the UE starts to transmit the measurement report over the air interface. This requirement assumes that the measurement report is not delayed by other RRC signalling on the DCCH. This measurement reporting delay excludes a delay uncertainty resulted when inserting the measurement report to the TTI of the uplink DCCH. The delay uncertainty is: $2 \times TTI_{DCCH}$. This measurement reporting delay excludes a delay which caused by no UL resources for UE to send the measurement report. The event triggered measurement reporting delay, measured without L3 filtering is less than $T_{identify\ intra\ with\ index}$ or $T_{identify\ intra\ without\ index}$. When L3 filtering is used an additional delay can be expected.

If a cell which has been detectable at least for the time period than $T_{identify\ intra\ without\ index}$ or $T_{identify\ intra\ with\ index}$ discussed infra becomes undetectable for a period TBD seconds and then the cell becomes detectable again and triggers an event, the event triggered measurement reporting delay shall be less than $T_{Measurement\_Period,\ Intra}$ provided the timing to that cell has not changed more than ±TBD Ts and the L3 filter has not been used. When L3 filtering is used, an additional delay can be expected.

For intra-frequency measurements with no measurement gaps, the UE is to identify a new detectable intra frequency cell within $T_{identify\_intra\_without\_index}$ if UE is not indicated to report SSB based RRM measurement result with the associated SSB index, or the UE has been indicated that the neighbour cell is synchronous with the serving cell. Otherwise UE shall be able to identify a new detectable intra frequency cell within $T_{identify\_intra\_with\_index}$. The UE shall be able to identify a new detectable intra frequency SS block of an already detected cell within $T_{identify\_intra\_without\_index}$.

$$T_{identify\_intra\_without\_index} = K_{ca}(T_{PSS/SSS\_sync} + T_{SSB\_measurement\_period})\ ms$$

$$T_{identify\_intra\_with\_index} = K_{ca}(T_{PSS/SSS\_sync} + T_{SSB\_measurement\_period} + T_{SSB\_time\_index})\ ms$$

where $T_{PSS/SSS\_sync}$ is the time period used in PSS/SSS detection; $T_{SSB\_time\_index}$ is the time period used to acquire the index of the SSB being measured; $T_{SSB\_measurement\_period}$ is equal to a measurement period of SSB based measurement; $K_{ca}=1$ for FR1 for measurements on frequencies corresponding to PCell or PSCell, and $K_{ca}$ is the number of configured SCells for measurements on frequencies corresponding to FR1 only Scells. When intrafrequency SMTC is fully non overlapping with measurement gaps, Kp=1. When intrafrequency is partially overlapping with measurement gaps, Kp=1/(1−(SMTC period/MGRP)), where SMTC period<MGRP.

With respect to scheduling availability of UE during intrafrequency measurements, the UE is required to be capable of measuring without measurement gaps when the SSB is completely contained in the active bandwidth part of the UE. When the measurement signal has different subcarrier spacing than PDSCH/PDCCH and on frequency range FR2, there are restrictions on the scheduling availability as described as follows.

(1) There are no scheduling restrictions due to measurements performed with a same subcarrier spacing as PDSCH/PDCCH on FR1.

(2) When the UE supports simultaneousRxDataSSB-DiffNumerology, there are no restrictions on scheduling availability due to measurements. For UE which do not support simultaneousRxDataSSB-DiffNumerology, some restrictions apply due to SS-RSRP/RSRQ/SINR measurement. On restriction is that, if useServingCellTimingForSync is enabled, the UE is not expected to transmit PUCCH/PUSCH or receive PDCCH/PDSCH on SSB symbols to be measured, and on 1 data symbol before each consecutive SSB symbols and 1 data symbol after each consecutive SSB symbols within SMTC window duration. Another restriction is that, if useServingCellTimingForSync is not enabled the UE is not expected to transmit PUCCH/PUSCH or receive PDCCH/PDSCH on all symbols within SMTC window duration. When intra-band carrier aggregation is performed, the scheduling restrictions apply to all serving cells on the band. When inter-band carrier aggregation within FR1 is performed, there are no scheduling restrictions on FR1 serving cell(s) in the bands due to measurements performed on FR1 serving cell frequency layer in different bands (3) The following scheduling restriction applies due to SS-RSRP or SS-SINR measurement on an FR2 intra-frequency cell: the UE is not expected to transmit PUCCH/PUSCH or receive PDCCH/PDSCH on SSB symbols to be measured, 1 symbol before each consecutive SSB symbols and 1 data symbol after each consecutive SSB symbols within SMTC window duration (it is assumed that useServingCellTimingForSync is always enabled for FR2). The following scheduling restriction applies to SS-RSRQ measurement on an FR2 intra-frequency cell: the UE is not expected to transmit PUCCH/PUSCH or receive PDCCH/PDSCH on SSB symbols to be measured, RSSI measurement symbols, 1 data symbol before each consecutive SSB/RSSI symbols and 1 data symbol after each consecutive SSB/RSSI symbols within SMTC window duration (it is assumed that useServingCellTimingForSync is always enabled for FR2). When intra-band carrier aggregation is performed, the scheduling restrictions apply to all serving cells on the band. When inter-band carrier aggregation within FR2 is performed, the scheduling restrictions apply to all serving cells on the bands.

(4) There are no scheduling restrictions on FR1 serving cell(s) due to measurements performed on FR2 serving cell frequency layer. There are no scheduling restrictions on FR2 serving cell(s) due to measurements performed on FR1 serving cell frequency layer For intra-frequency measurements with measurement gaps, the UE is to identify a new detectable intra frequency cell within $T_{identify\_intra\_without\_index}$ if UE is not indicated to report SSB based RRM measurement result with the associated SSB index, or the UE has been indicated that the neighbour cell is synchronous with the serving cell. Otherwise UE is to identify a new detectable intra frequency cell within $T_{identify\_intra\_with\_index}$. The UE is to identify a new detectable intra frequency SS block of an already detected cell within $T_{identify\_intra\_without\_index}$.

$$T_{identify\_intra\_without\_index} = T_{PSS/SSS\_sync} + T_{SSB\_measurement\_period}\ ms$$

$$T_{identify\_intra\_with\_index} = T_{PSS/SSS\_sync} + T_{SSB\_measurement\_period} + T_{SSB\_time\_index}$$

where $T_{PSS/SSS\_sync}$ is the time period used in PSS/SSS detection; $T_{SSB\_time\_index}$ is the time period used to acquire the index of the SSB being measured; and $T_{SSB\_measurement\_period}$ is equal to a measurement period of SSB based measurement.

Inter-Frequency Measurements

For inter-frequency NR cells, the UE identifies new inter-frequency cells and performs SS-RSRP or SS-RSRQ measurements of identified inter-frequency cells if carrier frequency information is provided by the serving cell, even if no explicit neighbour list with physical layer cell identities is provided. The UE evaluates whether a newly detectable inter-frequency cell meets a reselection criteria within $K_{carrier}*T_{detect,NR\_Inter}$ if at least carrier frequency information is provided for inter-frequency neighbour cells by the serving cells when $T_{reselection}=0$ provided that the reselection criteria is met by a certain predefined or configured margin. An inter-frequency cell is considered to be detectable according to a predefined or configured SS-RSRP, SS-RSRP Ês/Iot for a corresponding band.

When higher priority cells are found by the higher priority search, these cells are measured at least every $T_{measure,NR\_Inter}$. If, after detecting a cell in a higher priority search, it is determined that reselection has not occurred then the UE is not required to continuously measure the detected cell to evaluate the ongoing possibility of reselection. However, the minimum measurement filtering requirements specified later in this section shall still be met by the UE before it makes any determination that it may stop measuring the cell. If the UE detects on a NR carrier a cell whose physical identity is indicated as not allowed for that carrier in the measurement control system information of the serving cell, the UE is not required to perform measurements on that cell.

The UE measures SS-RSRP or SS-RSRQ at least every $K_{carrier}*T_{measure,NR\_Inter}$ for identified lower or equal priority inter-frequency cells. If the UE detects on a NR carrier a cell whose physical identity is indicated as not allowed for that carrier in the measurement control system information of the serving cell, the UE is not required to perform measurements on that cell. The UE filters SS-RSRP or SS-RSRQ measurements of each measured higher, lower and equal priority inter-frequency cell using at least 2 measurements. Within the set of measurements used for the filtering, at least two measurements shall be spaced by at least $T_{measure,NR\_Inter}/2$. For an inter-frequency cell that has been already detected, but that has not been reselected to, the filtering shall be such that the UE shall be capable of evaluating that the inter-frequency cell has met a reselection criterion within $K_{carrier}*T_{evaluate,NR\_Inter}$ when $T_{reselection}=0$ provided that the reselection criteria is met by a predefined or configured margin. When evaluating cells for reselection, the side conditions for SS-RSRP apply to both serving and inter-frequency cells. If the $T_{reselection}$ timer has a non-zero value and the inter-frequency cell is better ranked than the serving cell, the UE evaluates this inter-frequency cell for the $T_{reselection}$ time, and if this cell remains better ranked within this duration, then the UE reselects to that cell.

A measurement is defined to be an SSB inter-frequency measurement provided it is not defined as an intra-frequency measurement as discussed previously. The UE is to identify new inter-frequency cells and perform SS-RSRP, SS-RSRQ, and SS-SINR measurements of identified inter-frequency cells if carrier frequency information is provided by the PCell or the PSCell, even if no explicit neighbor list with physical layer cell identities is provided. SSB measurements are configured along with a measurement timing configuration (SMTC) per carrier, which provides periodicity, duration and offset information on a window of up to 5 ms where the measurements on the configured inter-frequency carrier are to be performed. For inter-frequency connected mode measurements, one measurement window periodicity may be configured per inter-frequency measurement object.

When measurement gaps are needed, the UE is not expected to detect SSB on an inter-frequency measurement object which start earlier than the gap starting time+switching time, nor detect SSB which end later than the gap end−switching time. When the inter-frequency cells are in FR2 and the per-FR gap is configured to the UE, the switching time is 0.25 ms. Otherwise the switching time is 0.5 ms.

For each inter-frequency layer, the UE is capable of monitoring at least 4 cells.

The number of cell and number of SSB requirements for FR1 are as follows: For each inter-frequency layer, the UE shall be capable of monitoring at least 4 cells. For each inter-frequency layer, during each layer 1 measurement period, the UE shall be capable of monitoring at least SSBs with different SSB index and/or PCI on the inter-frequency layer.

The number of cell and number of SSB requirements for FR2 are as follows: For each inter-frequency layer, the UE shall be capable of monitoring at least 4 cells. For each inter-frequency layer, during each layer 1 measurement period, the UE shall be capable of monitoring at least SSBs with different SSB index and/or PCI on the inter-frequency layer. The UE shall be capable of monitoring at least one SSB per cell.

When measurement gaps are provided, or the UE supports capability of conducting such measurements without gaps, the UE shall be able to identify a new detectable inter frequency cell within $T_{identify\_inter\_without\_index}$ if UE is not indicated to report SSB based RRM measurement result with the associated SSB index. Otherwise UE shall be able to identify a new detectable inter frequency cell within $T_{identify\_inter\_with\_index}$. The UE shall be able to identify a new detectable inter frequency SS block of an already detected cell within $T_{SSB\_time\_index\_inter}$.

$$T_{identify\_inter\_without\_index}=(T_{PSS/SSS\_sync\_inter}+T_{SSB\_measurement\_period\_inter})\text{ ms}$$

$$T_{identify\_inter\_with\_index}=(T_{PSS/SSS\_sync\_inter}+T_{SSB\_measurement\_period\_inter}+T_{SSB\_time\_index\_inter})\text{ ms}$$

where $T_{PSS/SSS\_sync\_inter}$ is the time period used in PSS/SSS detection; $T_{SSB\_time\_index\_inter}$ is the time period used to acquire the index of the SSB being measured; and $T_{SSB\_measurement\_period\_inter}$ is equal to a measurement period of SSB based measurement.

When measurement gaps are provided for inter frequency measurements, or the UE supports a capability of conducting such measurements without gaps, the UE physical layer is capable of reporting SS-RSRP, SS-RSRQ and SS-SINR measurements to higher layers with a predetermined or configured measurement accuracy.

Measurement reporting may be periodic or event-triggered periodic. The periodically triggered measurement report is to include RSRP, RSRQ, and RS-SINR measurements. The UE does not send any event triggered measurement reports, as long as no reporting criteria are fulfilled. A measurement reporting delay is defined as the time between an event that will trigger a measurement report and the point when the UE starts to transmit the measurement report over the air interface. This requirement assumes that that the measurement report is not delayed by other RRC signalling on the [DCCH]. This measurement reporting delay excludes a delay uncertainty resulted when inserting the measurement report to the [TTI] of the uplink [DCCH]. The delay uncertainty is: $[2 \times TTI_{DCCH}]$. This measurement reporting delay excludes a delay which caused by no UL resources for UE to send the measurement report. The event triggered measurement reporting delay, measured without L3 filtering shall be less than $[T_{identify\text{-}inter}]$. When L3 filtering is used an additional delay can be expected. If a cell which has been detectable at least for the time period $[T_{identify\_inter}]$ and then triggers the measurement report, the event triggered measurement reporting delay is less than [$T_{Measurement\_Period\_Inter\_FDD}$] provided the timing to that cell has not changed more than [±50 Ts] while measurement gap has not been available and the L3 filter has not been used. When L3 filtering is used an additional delay can be expected.

Inter-RAT Measurements

For inter-RAT measurements, such as FDD/TDD NR-EUTRAN measurements, the UE is required to be in the RRC_CONNECTED state, configured with at least a Pcell, and configured with an appropriate measurement gap pattern. Example gap patterns are shown by Table 9.4.1-1 in 3GPP TS 38.133 V15.6.0 (2019 June) as shown below:

TABLE 9.4.1-1

Minimum available time for inter-RAT measurements

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) |
|---|---|---|---|
| 0 | 6 | 40 | 60 |
| 1 | 6 | 80 | 30 |
| 2 | 3 | 40 | 24$^{NOTE1}$ |
| 3 | 3 | 80 | 12$^{NOTE1}$ |

NOTE 1:
When determing UE requirements using Tinter1 for GP2 and GP3, Tinter1 = [60] for GP2 and Tinter1 = [30] for GP3 shall be used.
NOTE 2:
Measurement gaps pattern configurations applicability are as specified in Table 9.1.2-1.

For inter-RAT E-UTRA measurements, a measurement object is a single EUTRA carrier frequency. Associated with this E-UTRA carrier frequency, the gNodeB can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

For inter-RAT E-UTRAN measurement, the UE measures RSRP and RSRQ of detected EUTRA cells in the neighbor frequency list at the minimum measurement rate specified in this section. The parameter $N_{EUTRA\_carrier}$ is the number of carriers in the neighbour frequency list. The UE filters the RSRP and RSRQ measurements of each measured EUTRA cell using at least two measurements. Within the set of measurements used for the filtering, at least two measurements are spaced by at least half the minimum specified measurement period. The UE also evaluates whether a newly detectable inter-RAT E-UTRAN cell meets a reselection criteria within ($N_{EUTRA\_carrier}$)*$T_{detectEUTRA}$ when Srxlev≤$S_{nonIntraSearchP}$ or Squal≤$S_{nonIntraSearchQ}$ when Treselection$_{RAT}$=0 provided that the reselection criteria is met by a margin of at least 5 dB for reselections based on ranking or 6 dB for RSRP reselections based on absolute priorities or 4 dB for RSRQ reselections based on absolute priorities. If the $T_{reselection}$ timer has a non-zero value and the inter-RAT EUTRA cell is satisfied with the reselection criteria, the UE evaluates this E-UTRA cell for the $T_{reselection}$ time. If this cell remains satisfied with the reselection criteria within this duration, then the UE reselects to that cell.

An E-UTRAN FDD cell of E-UTRAN TDD cell is considered to be detectable when RSRP related side conditions are fulfilled for a corresponding Band, RSRQ related side conditions are fulfilled for a corresponding Band, RS-SINR related side conditions are fulfilled for a corresponding Band, and/or SCH_RP and SCH Ês/Iot for a corresponding Band are fulfilled.

For E-UTRAN FDD cells, when the UE requires measurement gaps to identify and measurement inter-RAT cells and an appropriate measurement gap pattern is scheduled, the UE shall be able to identify a new detectable FDD cell within $T_{Identify,\ E\text{-}UTRAN\ FDD}$ according to the following expression:

$$T_{Identify,E\text{-}UTRAN\ FDD} = T_{BasicIdentify} * \frac{480}{T_{Inter1}} * K\ ms,$$

where $T_{BasicIdentify}$=480 ms, $T_{Inter1}$ is defined in table 9.4.1-1, K depends at least on $N_{freq,\ SA}$ and whether and how gaps are shared. Identification of a cell shall include detection of the cell and additionally performing a single measurement with measurement period of $T_{Measure,\ E\text{-}UTRAN\ FDD}$.

The UE is also capable of identifying and performing NR-E-UTRAN FDD RSRP, RSRQ, and RS-SINR measurements of at least 4 E-UTRAN FDD cells per E-UTRA FDD carrier frequency layer for up to 7 E-UTRA FDD carrier frequency layers. If higher layer filtering is used, an additional cell identification delay can be expected.

When DRX is in use and measurement gaps are configured, the UE shall be able to identify a new detectable E-UTRAN FDD cell within $T_{Identify,\ E\text{-}UTRAN\ FDD}$. When DRX is in use, the UE shall be capable of performing NR-E-UTRAN FDD RSRP and RSRQ measurements of at least 4 E-UTRAN FDD cells per E-UTRA FDD frequency layer for up to 7 E-UTRA FDD carrier frequency layers, and the UE physical layer shall be capable of reporting NR-E-UTRAN FDD RSRP and RSRQ measurements to higher layers with the measurement period $T_{measure,\ E\text{-}UTRAN\ FDD}$. If higher layer filtering is used, an additional cell identification delay can be expected.

Measurement reporting may be periodic, event-triggered periodic, or event-triggered. The periodically triggered measurement report is to include RSRP, RSRQ, and RS-SINR measurements. The UE does not send any event triggered measurement reports, as long as no reporting criteria are fulfilled. The measurement reporting delay is defined as the time between an event that will trigger a measurement report and the point when the UE starts to transmit the measurement report over the air interface. This requirement assumes that that the measurement report is not delayed by other RRC signalling on the DCCH. This measurement reporting delay excludes a delay uncertainty resulted when inserting the measurement report to the TTI of the uplink DCCH. The delay uncertainty is: 2×TTI$_{DCCH}$ where TTI$_{DCCH}$ is the duration of subframe or slot or subslot when the measurement report is transmitted on the PUSCH with subframe or slot or subslot duration. This measurement reporting delay excludes a delay which caused by no UL resources for UE to send the measurement report. The event triggered measurement reporting delay, measured without L3 filtering shall be less than $T_{Identify,\ E\text{-}UTRAN\ FDD}$ without DRX and with DRX, respectively. When L3 filtering is used, an additional delay can be expected. If a cell which has been detectable at least for the time period $T_{Identify,\ E\text{-}UTRAN\ FDD}$ (for FDD cells) or $T_{Identify,\ E\text{-}UTRAN\ TDD}$ (for TDD cells) becomes undetectable for a period TBD seconds and then the cell becomes detectable again and triggers an event, the event triggered measurement reporting delay shall be less than $T_{Measure, E\text{-}UTRAN\ FDD}$ or $T_{Measure, E\text{-}UTRAN\ TDD}$ provided the timing to that cell has not changed more than ±50 Ts while measurement gap has not been available and the L3 filter has not been used.

For E-UTRAN TDD cells the UE requires measurement gaps to identify and measurement inter-RAT cells and an appropriate measurement gap pattern is scheduled, the UE is to identify a new detectable FDD cell within $T_{Identify, E\text{-}UTRAN\ TDD}$ according to the following expression:

$$T_{Identifi, E\text{-}UTRAN\ FDD} = T_{BasicIdentify} * \frac{480}{T_{Inter1}} * K\ ms,$$

when configuration 0 or configuration 1 is applied; or $$T_{Identifi, E\text{-}UTRAN\ FDD} = \left(T_{BasicIdentify} * \frac{480}{T_{Inter1}} + 240\right) * K\ ms,$$

when configuration 2 or configuration 3 is applied.

In the above equations, $T_{BasicIdentify}$=480 ms, $T_{Inter1}$ is defined in table 9.4.1-1, and K depends at least on $N_{freq,\ SA}$ and whether and how gaps are shared. Identification of a cell shall include detection of the cell and additionally performing a single measurement with measurement period of $T_{Measure,\ E\text{-}UTRAN\ TDD}$.

The UE is also capable of identifying and performing NR-E-UTRAN TDD RSRP, RSRQ, and RS-SINR measurements of at least 4 E-UTRAN TDD cells per E-UTRA TDD carrier frequency layer for up to 7 E-UTRA TDD carrier frequency layers. If higher layer filtering is used, an additional cell identification delay can be expected.

When DRX is in use and measurement gaps are configured, the UE shall be able to identify a new detectable E-UTRAN TDD cell within $T_{Identify,\ E\text{-}UTRAN\ TDD}$. When DRX is in use, the UE shall be capable of performing NR-E-UTRAN TDD RSRP and RSRQ measurements of at least 4 E-UTRAN TDD cells per E-UTRA TDD frequency layer for up to 7 E-UTRA TDD carrier frequency layers, and the UE physical layer shall be capable of reporting NR-E-UTRAN TDD RSRP and RSRQ measurements to higher layers with the measurement period $T_{measure,\ E\text{-}UTRAN\ TDD}$. If higher layer filtering is used, an additional cell identification delay can be expected.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some of these embodiments, the UEs 101 may be NB-IoT UEs 101. NB-IoT provides access to network services using physical layer optimized for very low power consumption (e.g., full carrier BW is 180 kHz, subcarrier spacing can be 3.75 kHz or 15 kHz). A number of E-UTRA functions are not used for NB-IoT and need not be supported by RAN nodes 111 and UEs 101 only using NB-IoT. Examples of such E-UTRA functions may include inter-RAT mobility, handover, measurement reports, public warning functions, GBR, CSG, support of HeNBs, relaying, carrier aggregation, dual connectivity, NAICS, MBMS, real-time services, interference avoidance for in-device coexistence, RAN assisted WLAN interworking, sidelink communication/discovery, MDT, emergency call, CS fallback, self-configuration/self-optimization, among others. For NB-IoT operation, a UE 101 operates in the DL using 12 sub-carriers with a sub-carrier BW of 15 kHz, and in the UL using a single sub-carrier with a sub-carrier BW of either 3.75 kHz or 15 kHz or alternatively 3, 6 or 12 sub-carriers with a sub-carrier BW of 15 kHz.

In various embodiments, the UEs 101 may be MF UEs 101. MF UEs 101 are LTE-based UEs 101 that operate (exclusively) in unlicensed spectrum. This unlicensed spectrum is defined in MF specifications provided by the MulteFire Forum, and may include, for example, 1.9 GHz (Japan), 3.5 GHz, and 5 GHz. MulteFire is tightly aligned with 3GPP standards and builds on elements of the 3GPP specifications for LAA/eLAA, augmenting standard LTE to operate in global unlicensed spectrum. In some embodiments, LBT may be implemented to coexist with other unlicensed spectrum networks, such as WiFi, other LAA networks, or the like. In various embodiments, some or all UEs 101 may be NB-IoT UEs 101 that operate according to MF. In such embodiments, these UEs 101 may be referred to as "MF NB-IoT UEs 101," however, the term "NB-IoT UE 101" may refer to an "MF UE 101" or an "MF and NB-IoT UE 101" unless stated otherwise. Thus, the terms "NB-IoT UE 101," "MF UE 101," and "MF NB-IoT UE 101" may be used interchangeably throughout the present disclosure.

The UEs 101 may be configured to connect, for example, communicatively couple, with an or RAN 110. In embodiments, the RAN 110 may be an NG RAN or a 5G RAN, an E-UTRAN, an MF RAN, or a legacy RAN, such as a UTRAN or GERAN. As used herein, the term "NG RAN"

or the like may refer to a RAN 110 that operates in an NR or 5G system 100, the term "E-UTRAN" or the like may refer to a RAN 110 that operates in an LTE or 4G system 100, and the term "MF RAN" or the like refers to a RAN 110 that operates in an MF system 100. The UEs 101 utilize connections (or channels) 103 and 104, respectively, each of which comprises a physical communications interface or layer (discussed in further detail below). The connections 103 and 104 may include several different physical DL channels and several different physical UL channels. As examples, the physical DL channels include the PDSCH, PMCH, PDCCH, EPDCCH, MPDCCH, R-PDCCH, SPDCCH, PBCH, PCFICH, PHICH, NPBCH, NPDCCH, NPDSCH, and/or any other physical DL channels mentioned herein. As examples, the physical UL channels include the PRACH, PUSCH, PUCCH, SPUCCH, NPRACH, NPUSCH, and/or any other physical UL channels mentioned herein.

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more physical and/or logical channels, including but not limited to the PSCCH, PSSCH, PSDCH, and PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, gNodeBs, RAN nodes, eNBs, eNodeBs, NodeBs, RSUs, MF-APs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (e.g., a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher BW compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 320 of FIG. 3) via an NG interface (discussed infra). In MF implementations, the MF-APs 111 are entities that provide MulteFire radio services, and may be similar to eNBs 111 in an 3GPP architecture. Each MF-AP 111 includes or provides one or more MF cells.

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In LTE implementations, a DL resource grid can be used for DL transmissions from any of the RAN nodes 111 to the UEs 101, while UL transmissions from the UEs 101 to RAN nodes 111 can utilize a suitable UL resource grid in a similar manner. These resource grids may refer to time-frequency grids, and indicate physical resource in the DL or UL in each slot. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. The duration of the resource grid in the time domain corresponds to one slot in a radio frame. The resource grids comprises a number of RBs, which describe the mapping of certain physical channels to REs. In the frequency domain, this may represent the smallest quantity of resources that currently can be allocated. Each RB comprises a collection of REs. An RE is the smallest time-frequency unit in a resource grid. Each RE is uniquely identified by the index pair (k,l) in a slot where $k=0, \ldots, N_{RB}^{DL}N_{sc}^{RB}-1$ and $=0, \ldots, N_{symb}^{DL}-1$ are the indices in the frequency and time domains, respectively. RE (k,l) on antenna port p corresponds to the complex value $a_{k,l}^{(p)}$. An antenna port is defined such that the channel over which a symbol on the antenna port is conveyed can be inferred from the channel over which another symbol on the same antenna port is conveyed. There is one resource grid per antenna port. The set of antenna ports supported depends on the reference signal configuration in the cell, and these aspects are discussed in more detail in 3GPP TS 36.211.

In NR/5G implementations, DL and UL transmissions are organized into frames with 10 ms durations each of which includes ten 1 ms subframes. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with a half-frame 0 comprising subframes 0-4 and a half-frame 1 comprising subframes 5-9. There is one set of frames in the UL and one set of frames in the DL on a carrier. Uplink frame number i for transmission from the UE 101 starts $T_{TA}=(N_{TA}+N_{TA,offset})T_c$ before the start of the corresponding downlink frame at the UE where $N_{TA,offset}$ is given by 3GPP TS 38.213. For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by tables 4.3.2-1 and 4.3.2-2 of 3GPP TS 38.211. The start of slot $n_s^\mu$ in a subframe is aligned in time with the start of OFDM symbol $n_s^\mu N_{symb}^{slot}$ in the same subframe. OFDM symbols in a slot can be classified as 'downlink', 'flexible', or 'uplink', where downlink transmissions only occur in 'downlink' or 'flexible' symbols and the UEs 101 only transmit in 'uplink' or 'flexible' symbols.

For each numerology and carrier, a resource grid of $N_{grid}^{size,\mu}N_{sc}^{RB}$ subcarriers and $N_{symb}^{subframe,\mu}$ OFDM symbols is defined, starting at common RB $N_{grid}^{start,\mu}$ indicated by higher-layer signaling. There is one set of resource grids per transmission direction (i.e., uplink or downlink) with the subscript x set to DL for downlink and x set to UL for uplink. There is one resource grid for a given antenna port p, subcarrier spacing configuration y, and transmission direction (i.e., downlink or uplink).

An RB is defined as $N_{sc}^{RB}=12$ consecutive subcarriers in the frequency domain. Common RBs are numbered from 0 and upwards in the frequency domain for subcarrier spacing configuration μ. The center of subcarrier 0 of common resource block 0 for subcarrier spacing configuration μ coincides with 'point A'. The relation between the common resource block number $n_{CRB}^\mu$ in the frequency domain and resource elements (k,l) for subcarrier spacing configuration μ is given by $$n_{CRB}^\mu = \left\lfloor \frac{k}{N_{sc}^{RB}} \right\rfloor$$

where k is defined relative to point A such that k=0 corresponds to the subcarrier centered around point A. Point A serves as a common reference point for resource block grids and is obtained from offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2; and absoluteFrequencyPointA for all other cases where absoluteFrequencyPointA represents the frequency-location of point A expressed as in ARFCN.

A PRB for subcarrier configuration μ are defined within a BWP and numbered from 0 to $N_{BWP,i}^{size,\mu}-1$ where i is the number of the BWP. The relation between the physical resource block $n_{PRB}^\mu$ in BWPi and the common RB $n_{CRB}^\mu$ is given by $n_{CRB}^\mu = n_{PRB}^\mu + N_{BWP,i}^{start,\mu}$ where $N_{BWP,i}^{start,\mu}$ is the common RB where BWP starts relative to common RB 0.

VRBs are defined within a BWP and numbered from 0 to $N_{BWP,i}^{size}-1$ where i is the number of the BWP.

Each element in the resource grid for antenna port p and subcarrier spacing configuration μ is called an RE and is uniquely identified by $(k, l)_{p,\mu}$ where k is the index in the frequency domain and I refers to the symbol position in the time domain relative to some reference point. Resource element $(k, l)_{p,\mu}$ corresponds to a physical resource and the complex value $a_{k,l}^{(p,\mu)}$. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A BWP is a subset of contiguous common resource blocks defined in subclause 4.4.4.3 of 3GPP TS 38.211 for a given numerology u; in BWP i on a given carrier. The starting position $N_{BWP,i}^{start,\mu}$ and the number of resource blocks $N_{BWP,i}^{size,\mu}$ in a BWP shall fulfil $N_{grid,x}^{start,\mu} \leq N_{BWP,i}^{start,\mu} < N_{grid,x}^{start,\mu}+N_{grid,x}^{size,\mu}$ and $N_{grid,x}^{start,\mu} < N_{BWP,i}^{start,\mu}+N_{BWP,i}^{size,\mu} \leq N_{grid,x}^{start,\mu}+N_{grid,x}^{size,\mu}$, respectively. Configuration of a BWP is described in clause 12 of 3GPP TS 38.213. The UEs 101 can be configured with up to four BWPs in the DL with a single DL BWP being active at a given time. The UEs 101 are not expected to receive PDSCH, PDCCH, or CSI-RS (except for RRM) outside an active BWP. The UEs 101 can be configured with up to four BWPs in the UL with a single UL BWP being active at a given time. If a UE 101 is configured with a supplementary UL, the UE 101 can be configured with up to four additional BWPs in the supplementary UL with a single supplementary UL BWP being active at a given time. The UEs 101 do not transmit PUSCH or PUCCH outside an active BWP, and for an active cell, the UEs do not transmit SRS outside an active BWP.

An NB is defined as six non-overlapping consecutive PRBs in the frequency domain. The total number of DL NBs in the DL transmission BW configured in the cell is given by $$N_{NB}^{DL} = \left\lfloor \frac{N_{RB}^{DL}}{6} \right\rfloor.$$

The NBs are numbered $n_{NB}=0, \ldots, N_{NB}^{DL}-1$ in order of increasing PRB number where narrowband $n_{NB}$ is comprises PRB indices:

$$\begin{cases} 6n_{NB} + i_0 + i & \text{if } N_{RB}^{UL} \bmod 2 = 0 \\ 6n_{NB} + i_0 + i & \text{if } N_{RB}^{UL} \bmod 2 = 1 \text{ and } n_{NB} < N_{NB}^{UL}/2, \\ 6n_{NB} + i_0 + i + 1 & \text{if } N_{RB}^{UL} \bmod 2 = 1 \text{ and } n_{NB} \geq N_{NB}^{UL}/2 \end{cases}$$

$i = 0, 1, \ldots, 5$ where $i_0 = \left\lfloor \frac{N_{RB}^{UL}}{2} \right\rfloor - \frac{6N_{NB}^{UL}}{2}$.

If $N_{NB}^{UL} \geq 4$, a wideband is defined as four non-overlapping narrowbands in the frequency domain. The total number of uplink widebands in the uplink transmission bandwidth configured in the cell is given by $$N_{WB}^{UL} = \left\lfloor \frac{N_{NB}^{UL}}{4} \right\rfloor$$

and the widebands are numbered $n_{WB}=0, \ldots, N_{WB}^{UL}-1$ in order of increasing narrowband number where wideband $n_{WB}$ is composed of narrowband indices $4n_{WB}+i$ where $i=0, 1, \ldots, 3$. If $N_{NB}^{UL}<4$, then $N_{WB}^{UL}-1$ and the single wideband is composed of the $N_{NB}^{UL}$ non-overlapping narrowband(s).

There are several different physical channels and physical signals that are conveyed using RBs and/or individual REs. A physical channel corresponds to a set of REs carrying information originating from higher layers. Physical UL channels may include PUSCH, PUCCH, PRACH, and/or any other physical UL channel(s) discussed herein, and physical DL channels may include PDSCH, PBCH, PDCCH, and/or any other physical DL channel(s) discussed herein. A physical signal is used by the physical layer (e.g., PHY 710 of FIG. 7) but does not carry information originating from higher layers. Physical UL signals may include DMRS, PTRS, SRS, and/or any other physical UL signal(s) discussed herein, and physical DL signals may include DMRS, PTRS, CSI-RS, PSS, SSS, and/or any other physical DL signal(s) discussed herein.

The PDSCH carries user data and higher-layer signaling to the UEs 101. Typically, DL scheduling (assigning control and shared channel resource blocks to the UE 101 within a cell) may be performed at any of the RAN nodes 111 based on channel quality information fed back from any of the UEs 101. The downlink resource assignment information may be sent on the PDCCH used for (e.g., assigned to) each of the UEs 101. The PDCCH uses CCEs to convey control information (e.g., DCI), and a set of CCEs may be referred to a "control region." Control channels are formed by aggregation of one or more CCEs, where different code rates for the control channels are realized by aggregating different numbers of CCEs. The CCEs are numbered from 0 to $N_{CCE,k}-1$, where $N_{CCE,k}-1$ is the number of CCEs in the control region of subframe k. Before being mapped to REs, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical REs known as REGs. Four QPSK symbols may be mapped to each REG. The PDCCH can be transmitted using one or more CCEs, depending on the size of the DCI and the channel condition. There can be four or more different PDCCH formats defined with different numbers of CCEs (e.g., aggregation level, L=1, 2, 4, or 8 in LTE and L=1, 2, 4, 8, or 16 in NR). The UE 101 monitors a set of PDCCH candidates on one or more activated serving cells as configured by higher layer signaling for control information (e.g., DCI), where monitoring implies attempting to decode each of the PDCCHs (or PDCCH candidates) in the set according to all the monitored DCI formats (e.g., DCI formats 0 through 6-2 as discussed in section 5.3.3 of 3GPP TS 38.212, DCI formats 0_0 through 2_3 as discussed in section 7.3 of 3GPP TS 38.212, or the like). The UEs 101 monitor (or attempt to decode) respective sets of PDCCH candidates in one or more configured monitoring occasions according to the corresponding search space configurations. A DCI transports DL, UL, or SL scheduling information, requests for aperiodic CQI reports, LAA common information, notifications of MCCH change, UL power control commands for one cell and/or one RNTI, notification of a group of UEs 101 of a slot format, notification of a group of UEs of the PRB(s) and OFDM symbol(s) where UE may assume no transmission is intended for the UE, TPC commands for PUCCH and PUSCH, and/or TPC commands for PUCCH and PUSCH. The DCI coding steps are discussed in 3GPP TS 38.212.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

As alluded to previously, the PDCCH can be used to schedule DL transmissions on PDSCH and UL transmissions on PUSCH, wherein the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission(s) with configured grant; activation and deactivation of PDSCH semi-persistent transmission; notifying one or more UEs 101 of a slot format; notifying one or more UEs 101 of the PRB(s) and OFDM symbol(s) where a UE 101 may assume no transmission is intended for the UE; transmission of TPC commands for PUCCH and PUSCH; transmission of one or more TPC commands for SRS transmissions by one or more UEs 101; switching an active BWP for a UE 101; and initiating a random access procedure.

In NR implementations, the UEs 101 monitor (or attempt to decode) respective sets of PDCCH candidates in one or more configured monitoring occasions in one or more configured CORESETs according to the corresponding search space configurations. A CORESET may include a set of PRBs with a time duration of 1 to 3 OFDM symbols. A CORESET may additionally or alternatively include $N_{RB}^{CORESET}$ RBs in the frequency domain and $N_{symb}^{CORESET} \in \{1,2,3\}$ symbols in the time domain. A CORESET includes six REGs numbered in increasing order in a time-first manner, wherein an REG equals one RB during one OFDM symbol. The UEs 101 can be configured with multiple CORESETS where each CORESET is associated with one CCE-to-REG mapping only. Interleaved and non-interleaved CCE-to-REG mapping are supported in a CORESET. Each REG carrying a PDCCH carries its own DMRS.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the BWs of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The RAN nodes 111 may be configured to communicate with one another via interface 112. In embodiments where the system 100 is an LTE system (e.g., when CN 120 is an EPC 220 as in FIG. 2), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality. In embodiments where the system 100 is an MF system (e.g., when CN 120 is an NHCN 120), the interface 112 may be an X2 interface 112. The X2 interface may be defined between two or more RAN nodes 111 (e.g., two or more MF-APs and the like) that connect to NHCN 120, and/or between two MF-APs connecting to NHCN 120. In these embodiments, the X2 interface may operate in a same or similar manner as discussed previously.

In embodiments where the system 100 is a 5G or NR system (e.g., when CN 120 is an 5GC 320 as in FIG. 3), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, CN 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF (e.g., the N3 and/or N9 reference points), and the S1 control plane (NG-C) interface 115, which is a signaling interface between the RAN nodes 111 and AMFs 120 (e.g., the N2 reference point). Embodiments where the CN 120 is a 5GC 120 are discussed in more detail with regard to FIG. 3.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the Si interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

In embodiments where the CN 120 is an MF NHCN 120, the one or more network elements 122 may include or operate one or more NH-MMEs, local AAA proxies, NH-GWs, and/or other like MF NHCN elements. The NH-MME provides similar functionality as an MME in EPC 120. A local AAA proxy is an AAA proxy that is part of an NHN that provides AAA functionalities required for interworking with PSP AAA and 3GPP AAAs. A PSP AAA is an AAA server (or pool of servers) using non-USIM credentials that is associated with a PSP, and may be either internal or external to the NHN, and the 3GPP AAA is discussed in more detail in 3GPP TS 23.402. The NH-GW provides similar functionality as a combined S-GW/P-GW for non-EPC routed PDN connections. For EPC Routed PDN connections, the NHN-GW provides similar functionality as the S-GW discussed previously in interactions with the MF-APs over the S1 interface 113 and is similar to the TWAG in interactions with the PLMN PDN-GWs over the S2a interface. In some embodiments, the MF APs 111 may connect with the EPC 120 discussed previously. Additionally, the RAN 110 (referred to as an "MF RAN 110" or the like) may be connected with the NHCN 120 via an S1 interface 113. In these embodiments, the S interface 113 may be split into two parts, the S1-U interface 114 that carries traffic data between the RAN nodes 111 (e.g., the "MF-APs 111") and the NH-GW, and the S1-MME-N interface 115, which is a signaling interface between the RAN nodes 111 and NH-MMEs. The S1-U interface 114 and the S1-MME-N interface 115 have the same or similar functionality as the S1-U interface 114 and the S1-MME interface 115 of the EPC 120 discussed herein.

Figure 2:
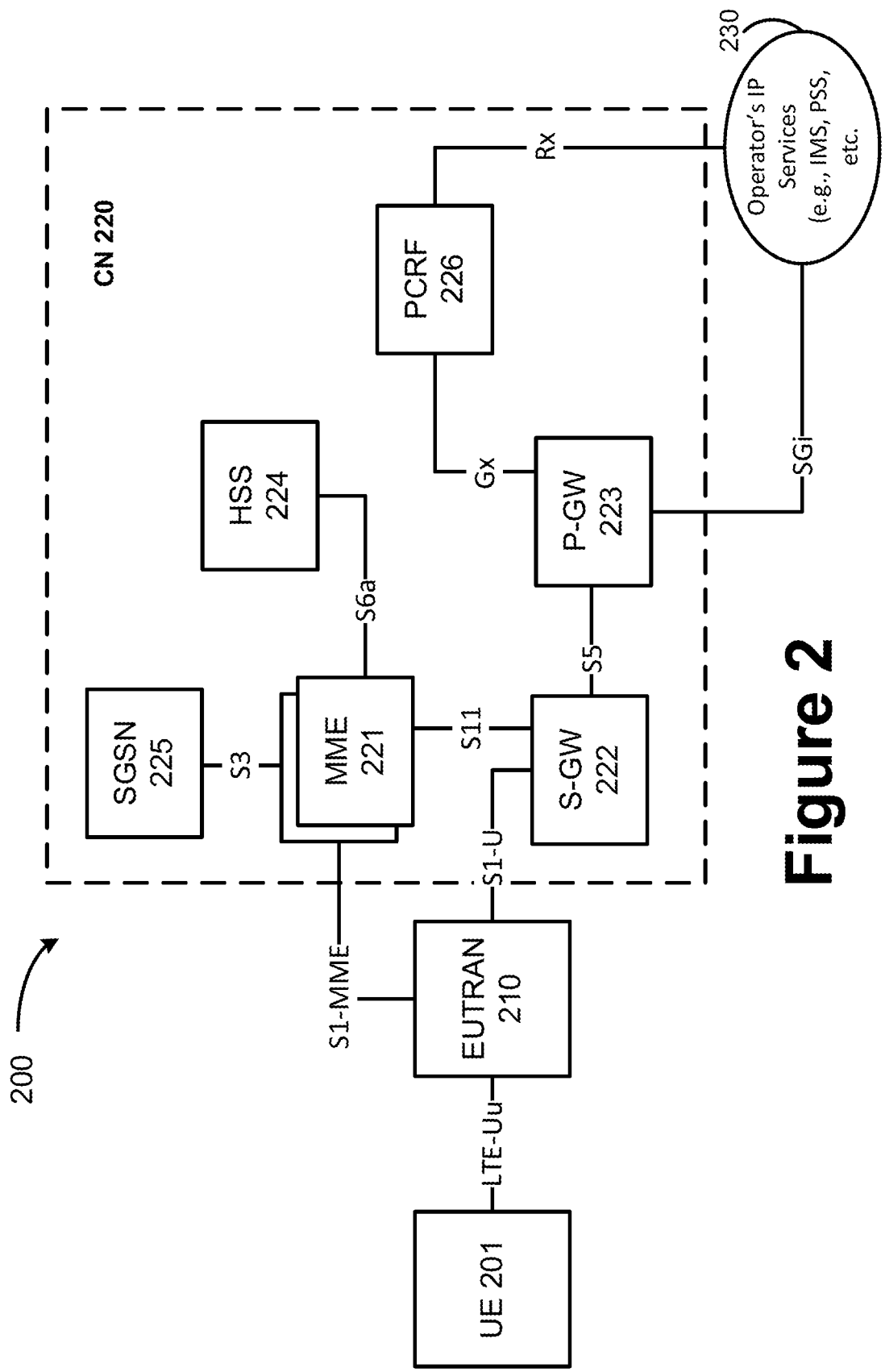
FIG. 2 illustrates an example architecture of a system including a first core network, in accordance with various embodiments.

FIG. 2 illustrates an example architecture of a system 200 including a first CN 220, in accordance with various embodiments. In this example, system 200 may implement the LTE standard wherein the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a P-GW 223, a HSS 224, and a SGSN 225.

The MMEs 221 may be similar in function to the control plane of legacy SGSN, and may implement MM functions to keep track of the current location of a UE 201. The MMEs 221 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 201, provide user identity confidentiality, and/or perform other like services to users/subscribers. Each UE 201 and the MME 221 may include an MM or EMM sublayer, and an MM context may be established in the UE 201 and the MME 221 when an attach procedure is successfully completed. The MM context may be a data structure or database object that stores MM-related information of the UE 201. The MMEs 221 may be coupled with the HSS 224 via an S6a reference point, coupled with the SGSN 225 via an S3 reference point, and coupled with the S-GW 222 via an S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network. The S3 reference point between the MMEs 221 and the SGSN 225 may enable user and bearer information exchange for inter-3GPP access network mobility in idle and/or active states.

The HSS 224 may comprise a database for network users, including subscription-related information to support the network entities' handling of communication sessions. The EPC 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc. An S6a reference point between the HSS 224 and the MMEs 221 may enable transfer of subscription and authentication data for authenticating/authorizing user access to the EPC 220 between HSS 224 and the MMEs 221.

The S-GW 222 may terminate the S1 interface 113 ("S1-U" in FIG. 2) toward the RAN 210, and routes data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 via an S5 reference point.

The P-GW 223 may terminate an SGi interface toward a PDN 230. The P-GW 223 may route data packets between the EPC 220 and external networks such as a network including the application server 130 (alternatively referred to as an "AF") via an IP interface 125 (see e.g., FIG. 1). In embodiments, the P-GW 223 may be communicatively coupled to an application server (application server 130 of FIG. 1 or PDN 230 in FIG. 2) via an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a PCRF 226 via a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate QoS and charging parameters. The PCRF 226 may provision this rule into a PCEF (not shown) with the appropriate TFT and QCI, which commences the QoS and charging as specified by the application server 230. The Gx reference point between the PCRF 226 and the P-GW 223 may allow for the transfer of QoS policy and charging rules from the PCRF 226 to PCEF in the P-GW 223. An Rx reference point may reside between the PDN 230 (or "AF 230") and the PCRF 226.

Figure 3:
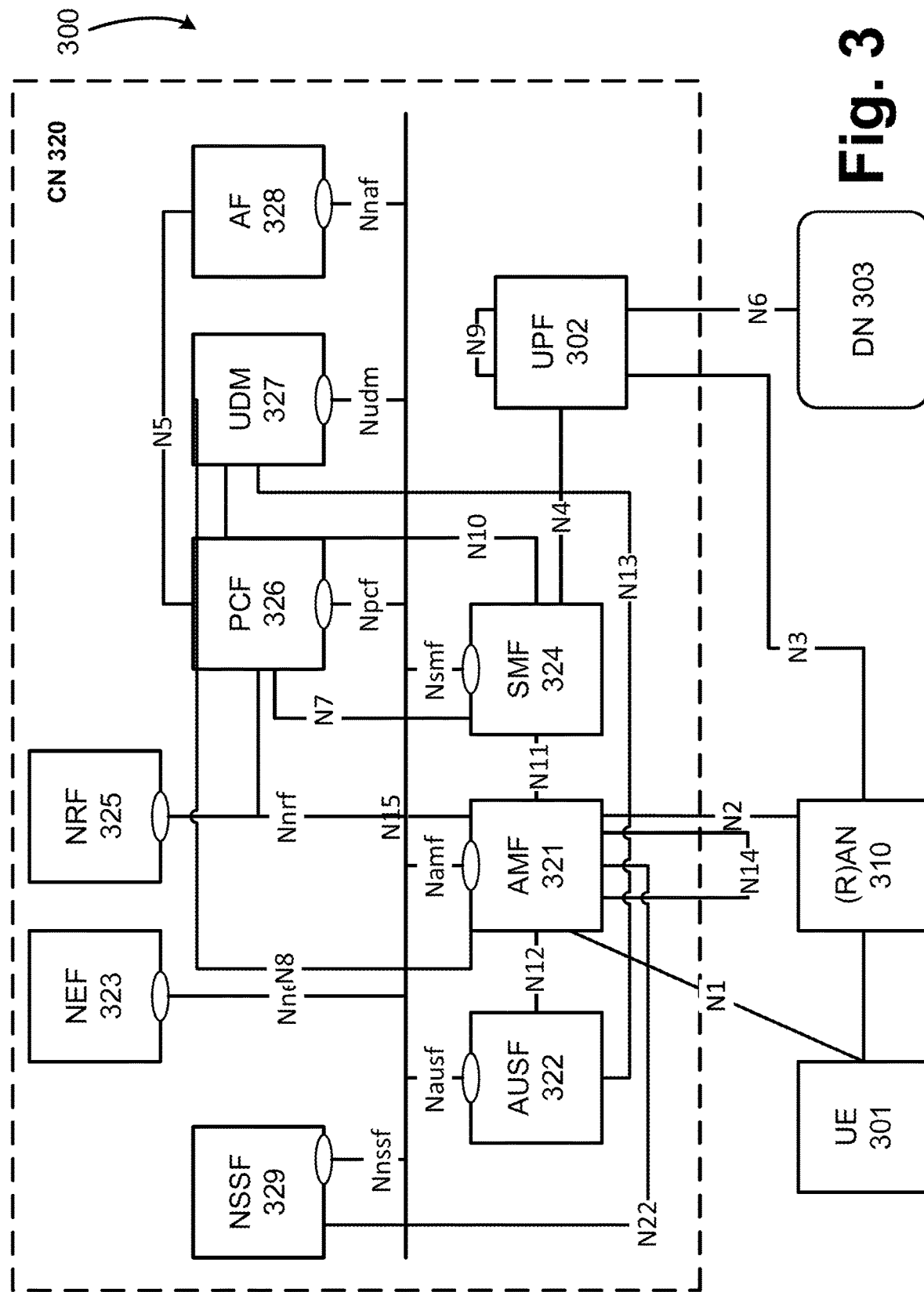
FIG. 3 illustrates an architecture of a system including a second core network in accordance with various embodiments.

FIG. 3 illustrates an architecture of a system 300 including a second CN 320 in accordance with various embodiments. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a DN 303, which may be, for example, operator services, Internet access or 3rd party services; and a 5GC 320. The 5GC 320 may include an AUSF 322; an AMF 321; a SMF 324; a NEF 323; a PCF 326; a NRF 325; a UDM 327; an AF 328; a UPF 302; and a NSSF 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 via an N4 reference point between the SMF 324 and the UPF 302.

The AUSF 322 may store data for authentication of UE 301 and handle authentication-related functionality. The AUSF 322 may facilitate a common authentication framework for various access types. The AUSF 322 may communicate with the AMF 321 via an N12 reference point between the AMF 321 and the AUSF 322; and may communicate with the UDM 327 via an N13 reference point between the UDM 327 and the AUSF 322. Additionally, the AUSF 322 may exhibit an Nausf service-based interface.

The AMF 321 may be responsible for registration management (e.g., for registering UE 301, etc.), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent proxy for routing SM messages. AMF 321 may also provide transport for SMS messages between UE 301 and an SMSF (not shown by FIG. 3). AMF 321 may act as SEAF, which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a SCM function, which receives a key from the SEA that it uses to derive access-network specific keys. Furthermore, AMF 321 may be a termination point of a RAN CP interface, which may include or be an N2 reference point between the (R)AN 310 and the AMF 321; and the AMF 321 may be a termination point of NAS (N1) signaling, and perform NAS ciphering and integrity protection.

AMF 321 may also support NAS signaling with a UE 301 over an N3 IWF interface. The N3IWF may be used to provide access to untrusted entities. N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signaling from the SMF 324 and the AMF 321 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3WF may also relay uplink and downlink control-plane NAS signaling between the UE 301 and AMF 321 via an N1 reference point between the UE 301 and the AMF 321, and relay uplink and downlink user-plane packets between the UE 301 and UPF 302. The N3WF also provides mechanisms for IPsec tunnel establishment with the UE 301. The AMF 321 may exhibit an Namf service-based interface, and may be a termination point for an N14 reference point between two AMFs 321 and an N17 reference point between the AMF 321 and a 5G-EIR (not shown by FIG. 3).

The UE 301 may need to register with the AMF 321 in order to receive network services. RM is used to register or deregister the UE 301 with the network (e.g., AMF 321), and establish a UE context in the network (e.g., AMF 321). The UE 301 may operate in an RM-REGISTERED state or an RM-DEREGISTERED state. In the RM-DEREGISTERED state, the UE 301 is not registered with the network, and the UE context in AMF 321 holds no valid location or routing information for the UE 301 so the UE 301 is not reachable by the AMF 321. In the RM-REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be a data structure, database object, etc. that indicates or stores, inter alia, a registration state per access type and the periodic update timer. The AMF 321 may also store a 5GC MM context that may be the same or similar to the (E)MM context discussed previously. In various embodiments, the AMF 321 may store a CE mode B Restriction parameter of the UE 301 in an associated MM context or RM context. The AMF 321 may also derive the value, when needed, from the UE's usage setting parameter already stored in the UE context (and/or MM/RM context).

CM may be used to establish and release a signaling connection between the UE 301 and the AMF 321 over the N1 interface. The signaling connection is used to enable NAS signaling exchange between the UE 301 and the CN 320, and comprises both the signaling connection between the UE and the AN (e.g., RRC connection or UE-N3IWF connection for non-3GPP access) and the N2 connection for the UE 301 between the AN (e.g., RAN 310) and the AMF 321. The UE 301 may operate in one of two CM states, CM-IDLE mode, or CM-CONNECTED mode. When the UE 301 is operating in the CM-IDLE state/mode, the UE 301 may have no NAS signaling connection established with the AMF 321 over the N1 interface, and there may be (R)AN 310 signaling connection (e.g., N2 and/or N3 connections) for the UE 301. When the UE 301 is operating in the CM-CONNECTED state/mode, the UE 301 may have an established NAS signaling connection with the AMF 321 over the N1 interface, and there may be a (R)AN 310 signaling connection (e.g., N2 and/or N3 connections) for the UE 301. Establishment of an N2 connection between the (R)AN 310 and the AMF 321 may cause the UE 301 to transition from CM-IDLE mode to CM-CONNECTED mode, and the UE 301 may transition from the CM-CONNECTED mode to the CM-IDLE mode when N2 signaling between the (R)AN 310 and the AMF 321 is released.

The SMF 324 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, etc. In such embodiments, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, and/or used for other purposes such as analytics. Additionally, the NEF 323 may exhibit an Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behaviour. The PCF 326 may also implement an FE to access subscription information relevant for policy decisions in a UDR of the UDM 327. The PCF 326 may communicate with the AMF 321 via an N15 reference point between the PCF 326 and the AMF 321, which may include a PCF 326 in a visited network and the AMF 321 in case of roaming scenarios. The PCF 326 may communicate with the AF 328 via an N5 reference point between the PCF 326 and the AF 328; and with the SMF 324 via an N7 reference point between the PCF 326 and the SMF 324. The system 300 and/or CN 320 may also include an N24 reference point between the PCF 326 (in the home network) and a PCF 326 in a visited network. Additionally, the PCF 326 may exhibit an Npcf service-based interface.

The UDM 327 may handle subscription-related information to support the network entities' handling of communication sessions, and may store subscription data of UE 301. For example, subscription data may be communicated between the UDM 327 and the AMF 321 via an N8 reference point between the UDM 327 and the AMF. The UDM 327 may include two parts, an application FE and a UDR (the FE and UDR are not shown by FIG. 3). The UDR may store subscription data and policy data for the UDM 327 and the PCF 326, and/or structured data for exposure and application data (including PFDs for application detection, application request information for multiple UEs 301) for the NEF 323. The Nudr service-based interface may be exhibited by the UDR 321 to allow the UDM 327, PCF 326, and NEF 323 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 324 via an N10 reference point between the UDM 327 and the SMF 324. UDM 327 may also support SMS management, wherein an SMS-FE implements the similar application logic as discussed previously. Additionally, the UDM 327 may exhibit the Nudm service-based interface.

The AF 328 may provide application influence on traffic routing, provide access to the NCE, and interact with the policy framework for policy control. The NCE may be a mechanism that allows the 5GC 320 and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit an Naf service-based interface.

The NSSF 329 may select a set of network slice instances serving the UE 301. The NSSF 329 may also determine allowed NSSAI and the mapping to the subscribed S-NS-SAIs, if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 via an N22 reference point between AMF 321 and NSSF 329; and may communicate with another NSSF 329 in a visited network via an N31 reference point (not shown by FIG. 3). Additionally, the NSSF 329 may exhibit an Nnssf service-based interface.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown by FIG. 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit an Nudsf service-based interface (not shown by FIG. 3). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity. In one example, the CN 320 may include an Nx interface, which is an inter-CN interface between the MME (e.g., MME 221) and the AMF 321 in order to enable interworking between CN 320 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
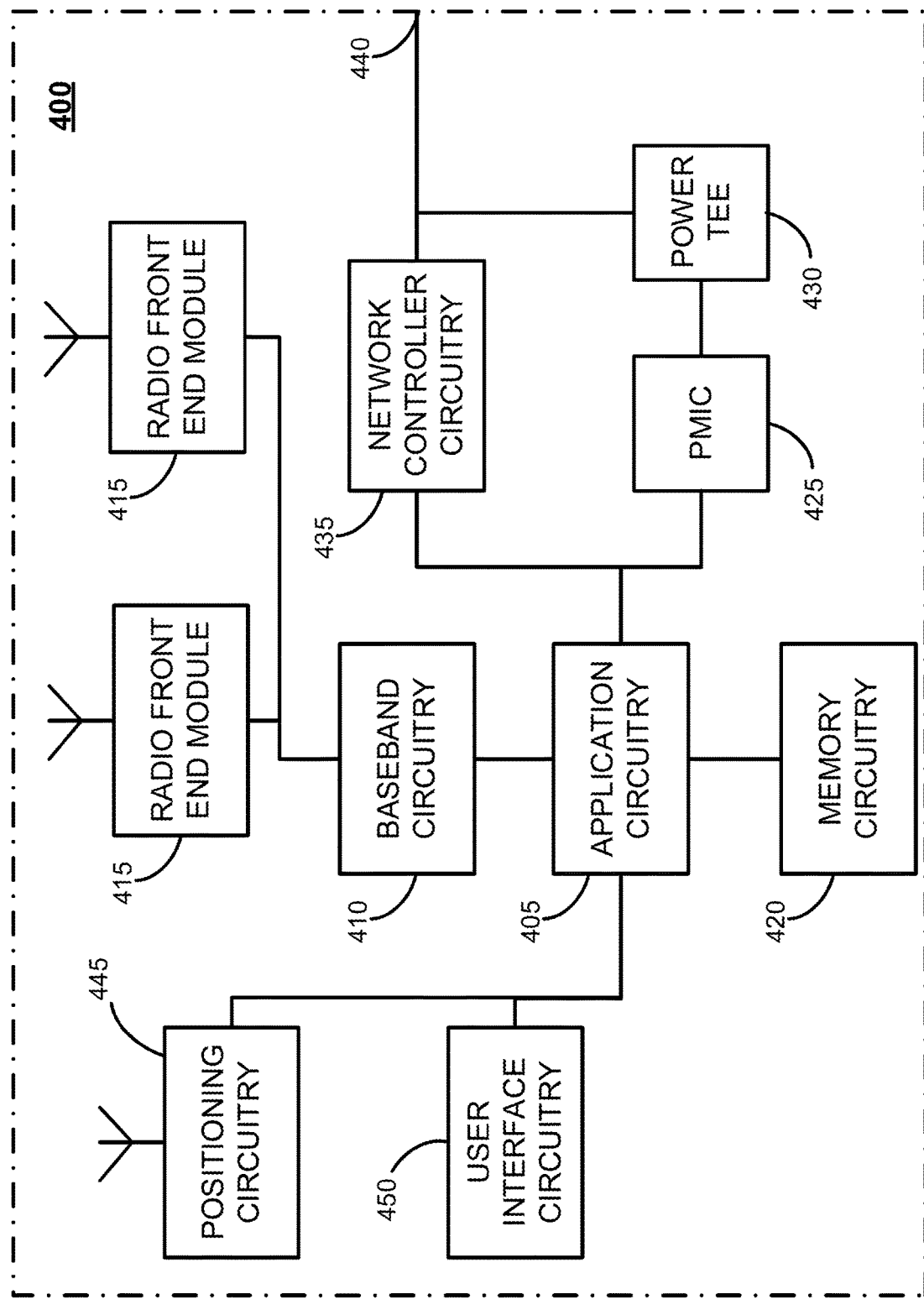
FIG. 4 illustrates an example of infrastructure equipment 400 in accordance with various embodiments.

FIG. 4 illustrates an example of infrastructure equipment 400 in accordance with various embodiments. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may comprise, or may be, a special-purpose processor/controller to operate according to the various embodiments herein. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 6.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 6111 of FIG. 6 infra), and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 5:
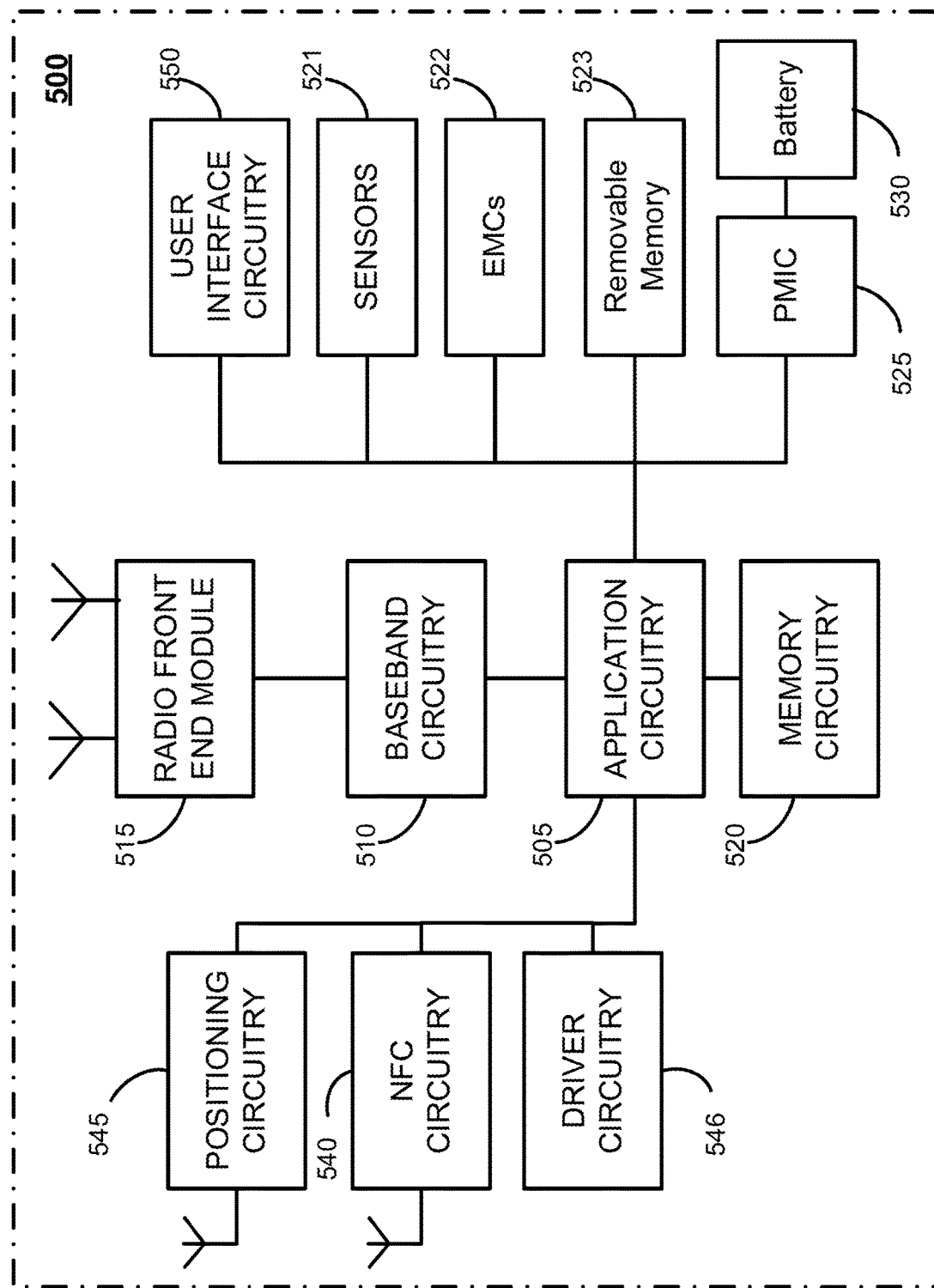
FIG. 5 illustrates an example of a platform or device in accordance with various embodiments.

FIG. 5 illustrates an example of a platform 500 (or "device 500") in accordance with various embodiments. In embodiments, the computer platform 500 may be suitable for use as UEs 101, 201, 301, application servers 130, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 405 may comprise, or may be, a special-purpose processor/controller to operate according to the various embodiments herein.

As examples, the processor(s) of application circuitry 505 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit, or a single package, such as the Edison™ or Galileo™ SoC boards from Intel® Corporation.

Additionally or alternatively, application circuitry 505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 6.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 6111 of FIG. 6 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 500 may incorporate the three-dimensional (3D) cross-point (XPOINT) memories from Intel® and Micron®.

Removable memory circuitry 523 may include devices, circuitry, enclosures/housings, ports, or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 522 include devices, modules, or subsystems whose purpose is to enable platform 500 to change its state, position, and/or orientation, or move or control a mechanism or (sub)system. Additionally, EMCs 522 may be configured to generate and send messages/signaling to other components of the platform 500 to indicate a current state of the EMCs 522. Examples of the EMCs 522 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 500 is configured to operate one or more EMCs 522 based on one or more captured events and/or instructions or control signals received from a service provider and/or various clients.

In some implementations, the interface circuitry may connect the platform 500 with positioning circuitry 545. The positioning circuitry 545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-PNT IC that uses a master timing clock to perform position tracking/estimation without GNSS assistance. The positioning circuitry 545 may also be part of, or interact with, the baseband circuitry 410 and/or RFEMs 515 to communicate with the nodes and components of the positioning network. The positioning circuitry 545 may also provide position data and/or time data to the application circuitry 505, which may use the data to synchronize operations with various infrastructure (e.g., radio base stations), for turn-by-turn navigation applications, or the like In some implementations, the interface circuitry may connect the platform 500 with Near-Field Communication (NFC) circuitry 540. NFC circuitry 540 is configured to provide contactless, short-range communications based on radio frequency identification (RFID) standards, wherein magnetic field induction is used to enable communication between NFC circuitry 540 and NFC-enabled devices external to the platform 500 (e.g., an "NFC touchpoint"). NFC circuitry 540 comprises an NFC controller coupled with an antenna element and a processor coupled with the NFC controller. The NFC controller may be a chip/IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 and/or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may often be included when the platform 500 is capable of being powered by a battery 530, for example, when the device is included in a UE 101, 201, 301.

In some embodiments, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 530 may power the platform 500, although in some examples the platform 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, sensing frequency, and the like.

A power block, or other power supply coupled to an electrical grid may be coupled with the BMS to charge the battery 530. In some examples, the power block XS30 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 550 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensor circuitry 521 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 6:
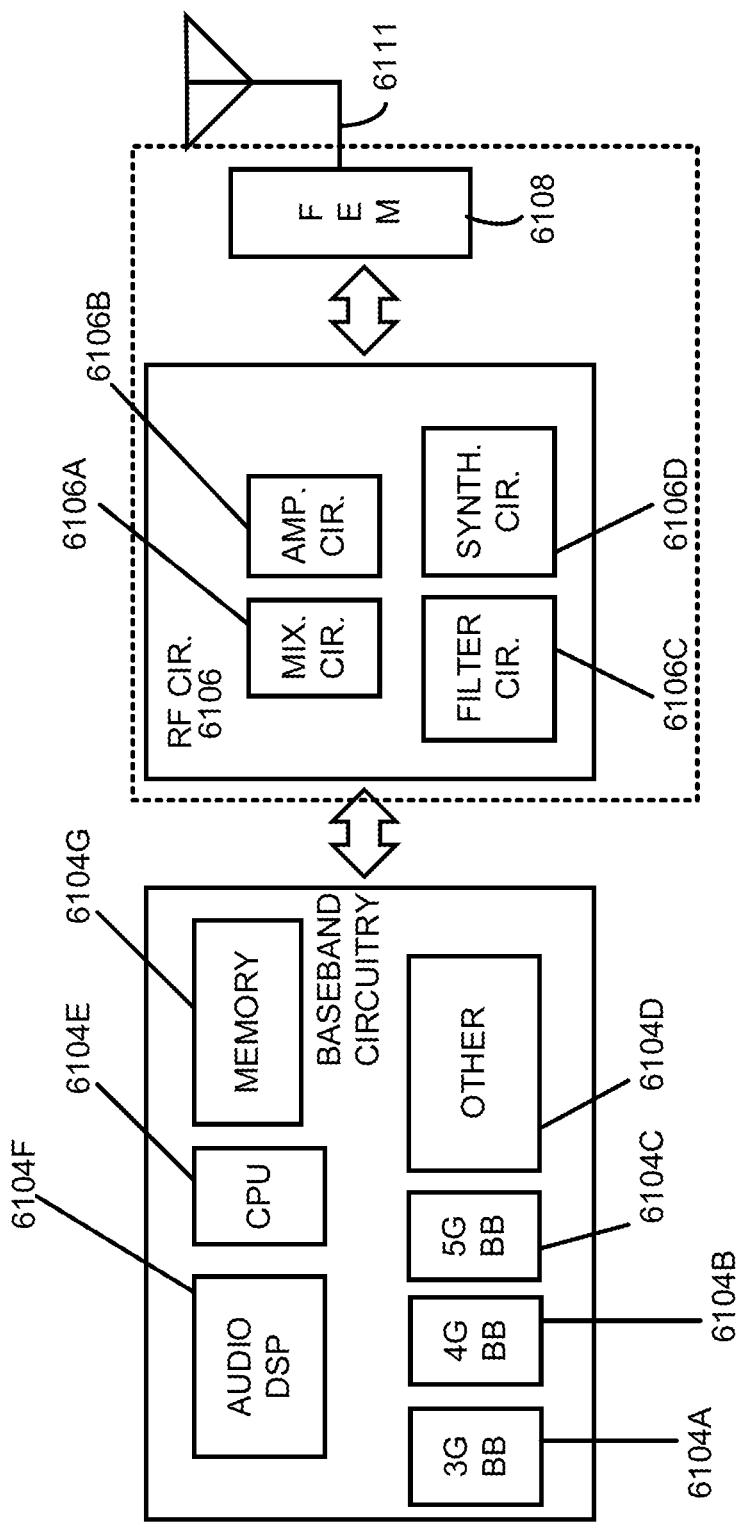
FIG. 6 illustrates example components of baseband circuitry and radio front end modules (RFEM) in accordance with various embodiments.

FIG. 6 illustrates example components of baseband circuitry 6110 and radio front end modules (RFEM) 6115 in accordance with various embodiments. The baseband circuitry 6110 corresponds to the baseband circuitry 410 and 510 of FIGS. 4 and 5, respectively. The RFEM 6115 corresponds to the RFEM 415 and 515 of FIGS. 4 and 5, respectively. As shown, the RFEMs 6115 may include Radio Frequency (RF) circuitry 6106, front-end module (FEM) circuitry 6108, antenna array 6111 coupled together at least as shown.

The baseband circuitry 6110 includes circuitry and/or control logic configured to carry out various radio/network protocol and radio control functions that enable communication with one or more radio networks via the RF circuitry 6106. The radio control functions may include, but are not limited to, signal modulation/demodulation, encoding/decoding, radio frequency shifting, etc. In some embodiments, modulation/demodulation circuitry of the baseband circuitry 6110 may include Fast-Fourier Transform (FFT), precoding, or constellation mapping/demapping functionality. In some embodiments, encoding/decoding circuitry of the baseband circuitry 6110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 6110 is configured to process baseband signals received from a receive signal path of the RF circuitry 6106 and to generate baseband signals for a transmit signal path of the RF circuitry 6106. The baseband circuitry 6110 is configured to interface with application circuitry 405/505 (see FIGS. 4 and 5) for generation and processing of the baseband signals and for controlling operations of the RF circuitry 6106. The baseband circuitry 6110 may handle various radio control functions.

The aforementioned circuitry and/or control logic of the baseband circuitry 6110 may include one or more single or multi-core processors. For example, the one or more processors may include a 3G baseband processor 6104A, a 4G/LTE baseband processor 6104B, a 5G/NR baseband processor 6104C, or some other baseband processor(s) 6104D for other existing generations, generations in development or to be developed in the future (e.g., sixth generation (6G), etc.). In other embodiments, some or all of the functionality of baseband processors 6104A-D may be included in modules stored in the memory 6104G and executed via a Central Processing Unit (CPU) 6104E. In other embodiments, some or all of the functionality of baseband processors 6104A-D may be provided as hardware accelerators (e.g., FPGAs, ASICs, etc.) loaded with the appropriate bit streams or logic blocks stored in respective memory cells. In various embodiments, the memory 6104G may store program code of a real-time OS (RTOS), which when executed by the CPU 6104E (or other baseband processor), is to cause the CPU 6104E (or other baseband processor) to manage resources of the baseband circuitry 6110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm, OKL4 provided by Open Kernel (OK) Labs®, or any other suitable RTOS, such as those discussed herein. In addition, the baseband circuitry 6110 includes one or more audio digital signal processor(s) (DSP) 6104F. The audio DSP(s) 6104F include elements for compression/decompression and echo cancellation and may include other suitable processing elements in other embodiments.

In some embodiments, each of the processors 6104A-6104E include respective memory interfaces to send/receive data to/from the memory 6104G. The baseband circuitry 6110 may further include one or more interfaces to communicatively couple to other circuitries/devices, such as an interface to send/receive data to/from memory external to the baseband circuitry 6110; an application circuitry interface to send/receive data to/from the application circuitry 405/505 of FIGS. 4-XT); an RF circuitry interface to send/receive data to/from RF circuitry 6106 of FIG. 6; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 525.

In alternate embodiments (which may be combined with the above described embodiments), baseband circuitry 6110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 6110 may include protocol processing circuitry with one or more instances of control circuitry (not shown) to provide control functions for the digital baseband circuitry and/or radio frequency circuitry (e.g., the radio front end modules 6115).

Although not shown by FIG. 6, in some embodiments, the baseband circuitry 6110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 6110 and/or RF circuitry 6106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 6110 and/or RF circuitry 6106 are part of a Wi-Fi communication system. In the second example, the protocol processing circuitry would operate Wi-Fi MAC and logical link control (LLC) functions. The protocol processing circuitry may include one or more memory structures (e.g., 6104G) to store program code and data for operating the protocol functions, as well as one or more processing cores to execute the program code and perform various operations using the data. The baseband circuitry 6110 may also support radio communications for more than one wireless protocol.

The various hardware elements of the baseband circuitry 6110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 6110 may be suitably combined in a single chip or chipset, or disposed on a same circuit board. In another example, some or all of the constituent components of the baseband circuitry 6110 and RF circuitry 6106 may be implemented together such as, for example, a system on a chip (SoC) or System-in-Package (SiP). In another example, some or all of the constituent components of the baseband circuitry 6110 may be implemented as a separate SoC that is communicatively coupled with and RF circuitry 6106 (or multiple instances of RF circuitry 6106). In yet another example, some or all of the constituent components of the baseband circuitry 6110 and the application circuitry 405/505 may be implemented together as individual SoCs mounted to a same circuit board (e.g., a "multi-chip package").

In some embodiments, the baseband circuitry 6110 may provide for communication compatible with one or more radio technologies. For example, in some embodiments, the baseband circuitry 6110 may support communication with an E-UTRAN or other WMAN, a WLAN, a WPAN. Embodiments in which the baseband circuitry 6110 is configured to support radio communications of more than one wireless protocol may be referred to as multi-mode baseband circuitry.

RF circuitry 6106 may enable communication with wireless networks using modulated electromagnetic radiation through a non-solid medium. In various embodiments, the RF circuitry 6106 may include switches, filters, amplifiers, etc. to facilitate the communication with the wireless network. RF circuitry 6106 may include a receive signal path, which may include circuitry to down-convert RF signals received from the FEM circuitry 6108 and provide baseband signals to the baseband circuitry 6110. RF circuitry 6106 may also include a transmit signal path, which may include circuitry to up-convert baseband signals provided by the baseband circuitry 6110 and provide RF output signals to the FEM circuitry 6108 for transmission.

In some embodiments, the receive signal path of the RF circuitry 6106 may include mixer circuitry 6106a, amplifier circuitry 6106b and filter circuitry 6106c. In some embodiments, the transmit signal path of the RF circuitry 6106 may include filter circuitry 6106c and mixer circuitry 6106a. RF circuitry 6106 may also include synthesizer circuitry 6106d for synthesizing a frequency for use by the mixer circuitry 6106a of the receive signal path and the transmit signal path. In some embodiments, the mixer circuitry 6106a of the receive signal path may be configured to down-convert RF signals received from the FEM circuitry 6108 based on the synthesized frequency provided by synthesizer circuitry 6106d. The amplifier circuitry 6106b may be configured to amplify the down-converted signals and the filter circuitry 6106c may be a low-pass filter (LPF) or band-pass filter (BPF) configured to remove unwanted signals from the down-converted signals to generate output baseband signals. Output baseband signals may be provided to the baseband circuitry 6110 for further processing. In some embodiments, the output baseband signals may be zero-frequency baseband signals, although this is not a requirement. In some embodiments, mixer circuitry 6106a of the receive signal path may comprise passive mixers, although the scope of the embodiments is not limited in this respect.

In some embodiments, the mixer circuitry 6106a of the transmit signal path may be configured to up-convert input baseband signals based on the synthesized frequency provided by the synthesizer circuitry 6106d to generate RF output signals for the FEM circuitry 6108. The baseband signals may be provided by the baseband circuitry 6110 and may be filtered by filter circuitry 6106c.

In some embodiments, the mixer circuitry 6106a of the receive signal path and the mixer circuitry 6106a of the transmit signal path may include two or more mixers and may be arranged for quadrature downconversion and upconversion, respectively. In some embodiments, the mixer circuitry 6106a of the receive signal path and the mixer circuitry 6106a of the transmit signal path may include two or more mixers and may be arranged for image rejection (e.g., Hartley image rejection). In some embodiments, the mixer circuitry 6106a of the receive signal path and the mixer circuitry 6106a of the transmit signal path may be arranged for direct downconversion and direct upconversion, respectively. In some embodiments, the mixer circuitry 6106a of the receive signal path and the mixer circuitry 6106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 6106 may include analog-to-digital converter (ADC) and digital-to-analog converter (DAC) circuitry and the baseband circuitry 6110 may include a digital baseband interface to communicate with the RF circuitry 6106.

In some dual-mode embodiments, a separate radio IC circuitry may be provided for processing signals for each spectrum, although the scope of the embodiments is not limited in this respect.

In some embodiments, the synthesizer circuitry 6106d may be a fractional-N synthesizer or a fractional N/N+1 synthesizer, although the scope of the embodiments is not limited in this respect as other types of frequency synthesizers may be suitable. For example, synthesizer circuitry 6106d may be a delta-sigma synthesizer, a frequency multiplier, or a synthesizer comprising a phase-locked loop with a frequency divider.

The synthesizer circuitry 6106d may be configured to synthesize an output frequency for use by the mixer circuitry 6106a of the RF circuitry 6106 based on a frequency input and a divider control input. In some embodiments, the synthesizer circuitry 6106d may be a fractional N/N+1 synthesizer.

In some embodiments, frequency input may be provided by a voltage controlled oscillator (VCO), although that is not a requirement. Divider control input may be provided by either the baseband circuitry 6110 or the application circuitry 405/505 depending on the desired output frequency. In some embodiments, a divider control input (e.g., N) may be determined from a look-up table based on a channel indicated by the application circuitry 405/505.

Synthesizer circuitry 6106d of the RF circuitry 6106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 6106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 6106 may include an IQ/polar converter.

FEM circuitry 6108 may include a receive signal path, which may include circuitry configured to operate on RF signals received from antenna array 6111, amplify the received signals and provide the amplified versions of the received signals to the RF circuitry 6106 for further processing. FEM circuitry 6108 may also include a transmit signal path, which may include circuitry configured to amplify signals for transmission provided by the RF circuitry 6106 for transmission by one or more of antenna elements of antenna array 6111. In various embodiments, the amplification through the transmit or receive signal paths may be done solely in the RF circuitry 6106, solely in the FEM circuitry 6108, or in both the RF circuitry 6106 and the FEM circuitry 6108.

In some embodiments, the FEM circuitry 6108 may include a TX/RX switch to switch between transmit mode and receive mode operation. The FEM circuitry 6108 may include a receive signal path and a transmit signal path. The receive signal path of the FEM circuitry 6108 may include an LNA to amplify received RF signals and provide the amplified received RF signals as an output (e.g., to the RF circuitry 6106). The transmit signal path of the FEM circuitry 6108 may include a power amplifier (PA) to amplify input RF signals (e.g., provided by RF circuitry 6106), and one or more filters to generate RF signals for subsequent transmission by one or more antenna elements of the antenna array 6111.

The antenna array 6111 comprises one or more antenna elements, each of which is configured convert electrical signals into radio waves to travel through the air and to convert received radio waves into electrical signals. For example, digital baseband signals provided by the baseband circuitry 6110 is converted into analog RF signals (e.g., modulated waveform) that will be amplified and transmitted via the antenna elements of the antenna array 6111 including one or more antenna elements (not shown). The antenna elements may be omnidirectional, direction, or a combination thereof. The antenna elements may be formed in a multitude of arranges as are known and/or discussed herein. The antenna array 6111 may comprise microstrip antennas or printed antennas that are fabricated on the surface of one or more printed circuit boards. The antenna array 6111 may be formed in as a patch of metal foil (e.g., a patch antenna) in a variety of shapes, and may be coupled with the RF circuitry 6106 and/or FEM circuitry 6108 using metal transmission lines or the like.

Processors of the application circuitry 405/505 and processors of the baseband circuitry 6110 may be used to execute elements of one or more instances of a protocol stack. For example, processors of the baseband circuitry 6110, alone or in combination, may be used execute Layer 3, Layer 2, or Layer 1 functionality, while processors of the application circuitry 405/505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
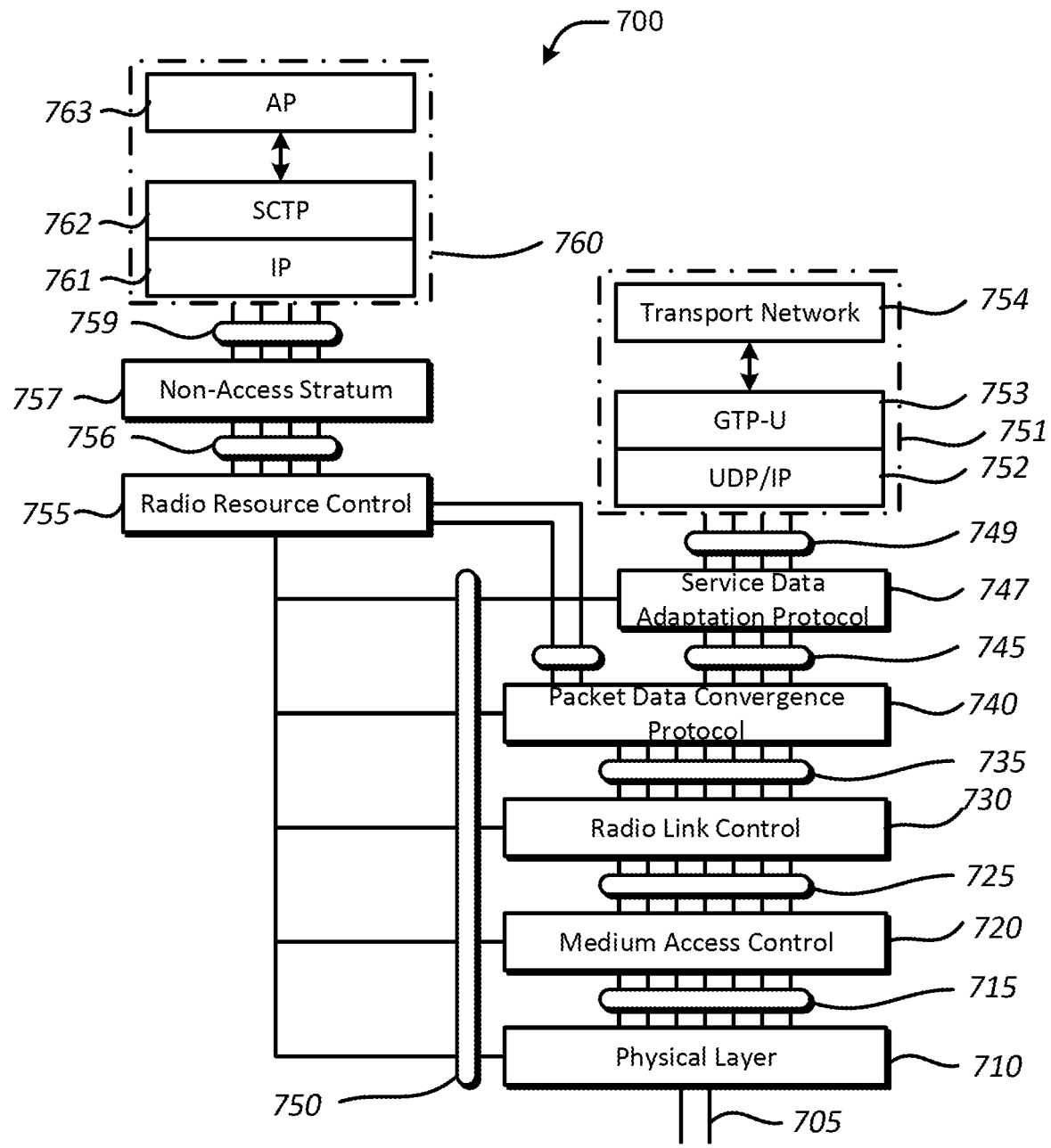
FIG. 7 illustrates various protocol functions that may be implemented in a wireless communication device according to various embodiments.

FIG. 7 illustrates various protocol functions that may be implemented in a wireless communication device according to various embodiments. In particular, FIG. 7 includes an arrangement 700 showing interconnections between various protocol layers/entities. The following description of FIG. 7 is provided for various protocol layers/entities that operate in conjunction with the 5G/NR system standards and LTE system standards, but some or all of the aspects of FIG. 7 may be applicable to other wireless communication network systems as well.

The protocol layers of arrangement 700 may include one or more of PHY 710, MAC 720, RLC 730, PDCP 740, SDAP 747, RRC 755, and NAS layer 757, in addition to other higher layer functions not illustrated. The protocol layers may include one or more service access points (e.g., items 759, 756, 750, 749, 745, 735, 725, and 715 in FIG. 7) that may provide communication between two or more protocol layers.

The PHY 710 may transmit and receive physical layer signals 705 that may be received from or transmitted to one or more other communication devices. The physical layer signals 705 may comprise one or more physical channels, such as those discussed herein. The PHY 710 may further perform link adaptation or adaptive modulation and coding (AMC), power control, cell search (e.g., for initial synchronization and handover purposes), and other measurements used by higher layers, such as the RRC 755. The PHY 710 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 710 may process requests from and provide indications to an instance of MAC 720 via one or more PHY-SAP 715. According to some embodiments, requests and indications communicated via PHY-SAP 715 may comprise one or more transport channels.

Instance(s) of MAC 720 may process requests from, and provide indications to, an instance of RLC 730 via one or more MAC-SAPs 725. These requests and indications communicated via the MAC-SAP 725 may comprise one or more logical channels. The MAC 720 may perform mapping between the logical channels and transport channels, multiplexing of MAC SDUs from one or more logical channels onto TBs to be delivered to PHY 710 via the transport channels, de-multiplexing MAC SDUs to one or more logical channels from TBs delivered from the PHY 710 via transport channels, multiplexing MAC SDUs onto TBs, scheduling information reporting, error correction through HARQ, and logical channel prioritization.

Instance(s) of RLC 730 may process requests from and provide indications to an instance of PDCP 740 via one or more radio link control service access points (RLC-SAP) 735. These requests and indications communicated via RLC-SAP 735 may comprise one or more RLC channels. The RLC 730 may operate in a plurality of modes of operation, including: Transparent Mode™, Unacknowledged Mode (UM), and Acknowledged Mode (AM). The RLC 730 may execute transfer of upper layer protocol data units (PDUs), error correction through automatic repeat request (ARQ) for AM data transfers, and concatenation, segmentation and reassembly of RLC SDUs for UM and AM data transfers. The RLC 730 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 740 may process requests from and provide indications to instance(s) of RRC 755 and/or instance(s) of SDAP 747 via one or more packet data convergence protocol service access points (PDCP-SAP) 745. These requests and indications communicated via PDCP-SAP 745 may comprise one or more radio bearers. The PDCP 740 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 747 may process requests from and provide indications to one or more higher layer protocol entities via one or more SDAP-SAP 749. These requests and indications communicated via SDAP-SAP 749 may comprise one or more QoS flows. The SDAP 747 may map QoS flows to DRBs, and vice versa, and may also mark QFIs in DL and UL packets. A single SDAP entity 747 may be configured for an individual PDU session. In the UL direction, the NG-RAN 110 may control the mapping of QoS Flows to DRB(s) in two different ways, reflective mapping or explicit mapping. For reflective mapping, the SDAP 747 of a UE 101 may monitor the QFIs of the DL packets for each DRB, and may apply the same mapping for packets flowing in the UL direction. For a DRB, the SDAP 747 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 755 configuring the SDAP 747 with an explicit QoS flow to DRB mapping rule, which may be stored and followed by the SDAP 747. In embodiments, the SDAP 747 may only be used in NR implementations and may not be used in LTE implementations.

The RRC 755 may configure, via one or more management service access points (M-SAP), aspects of one or more protocol layers, which may include one or more instances of PHY 710, MAC 720, RLC 730, PDCP 740 and SDAP 747. In embodiments, an instance of RRC 755 may process requests from and provide indications to one or more NAS entities 757 via one or more RRC-SAPs 756. The main services and functions of the RRC 755 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 757 may form the highest stratum of the control plane between the UE 101 and the AMF 321. The NAS 757 may support the mobility of the UEs 101 and the session management procedures to establish and maintain IP connectivity between the UE 101 and a P-GW in LTE systems.

According to various embodiments, one or more protocol entities of arrangement 700 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such embodiments, one or more protocol entities that may be implemented in one or more of UE 101, gNB 111, AMF 321, etc. may communicate with a respective peer protocol entity that may be implemented in or on another device using the services of respective lower layer protocol entities to perform such communication. In some embodiments, a gNB-CU of the gNB 111 may host the RRC 755, SDAP 747, and PDCP 740 of the gNB that controls the operation of one or more gNB-DUs, and the gNB-DUs of the gNB 111 may each host the RLC 730, MAC 720, and PHY 710 of the gNB 111.

In a first example, a control plane protocol stack may comprise, in order from highest layer to lowest layer, NAS 757, RRC 755, PDCP 740, RLC 730, MAC 720, and PHY 710. In this example, upper layers 760 may be built on top of the NAS 757, which includes an IP layer 761, an SCTP 762, and an application layer signaling protocol (AP) 763.

In NR implementations, the AP 763 may be an NG application protocol layer (NGAP or NG-AP) 763 for the NG interface 113 defined between the NG-RAN node 111 and the AMF 321, or the AP 763 may be an Xn application protocol layer (XnAP or Xn-AP) 763 for the Xn interface 112 that is defined between two or more RAN nodes 111.

The NG-AP 763 may support the functions of the NG interface 113 and may comprise Elementary Procedures (EPs). An NG-AP EP may be a unit of interaction between the NG-RAN node 111 and the AMF 321. The NG-AP 763 services may comprise two groups: UE-associated services (e.g., services related to a UE 101) and non-UE-associated services (e.g., services related to the whole NG interface instance between the NG-RAN node 111 and AMF 321). These services may include functions including, but not limited to: a paging function for the sending of paging requests to NG-RAN nodes 111 involved in a particular paging area; a UE context management function for allowing the AMF 321 to establish, modify, and/or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 763 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 763 may be an S1 Application Protocol layer (S1-AP) 763 for the S1 interface 113 defined between an E-UTRAN node 111 and an MME, or the AP 763 may be an X2 application protocol layer (X2AP or X2-AP) 763 for the X2 interface 112 that is defined between two or more E-UTRAN nodes 111.

The S1 Application Protocol layer (S1-AP) 763 may support the functions of the S1 interface, and similar to the NG-AP discussed previously, the S1-AP may comprise S1-AP EPs. An S1-AP EP may be a unit of interaction between the E-UTRAN node 111 and an MME 221 within an LTE CN 120. The S1-AP 763 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 763 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 762 may provide guaranteed delivery of application layer messages (e.g., NGAP or XnAP messages in NR implementations, or S1-AP or X2AP messages in LTE implementations). The SCTP 762 may ensure reliable delivery of signaling messages between the RAN node 111 and the AMF 321/MME 221 based, in part, on the IP protocol, supported by the IP 761. The Internet Protocol layer (IP) 761 may be used to perform packet addressing and routing functionality. In some implementations the IP layer 761 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 747, PDCP 740, RLC 730, MAC 720, and PHY 710. The user plane protocol stack may be used for communication between the UE 101, the RAN node 111, and UPF 302 in NR implementations or an S-GW 222 and P-GW 223 in LTE implementations. In this example, upper layers 751 may be built on top of the SDAP 747, and may include a user datagram protocol (UDP) and IP security layer (UDP/IP) 752, a General Packet Radio Service (GPRS) Tunneling Protocol for the user plane layer (GTP-U) 753, and a User Plane PDU layer (UP PDU) 763.

The transport network layer 754 (also referred to as a "transport layer") may be built on IP transport, and the GTP-U 753 may be used on top of the UDP/IP layer 752 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 753 may be used for carrying user data within the GPRS core network and between the radio access network and the core network. The user data transported can be packets in any of IPv4, IPv6, or PPP formats, for example. The UDP/IP 752 may provide checksums for data integrity, port numbers for addressing different functions at the source and destination, and encryption and authentication on the selected data flows. The RAN node 111 and the S-GW 222 may utilize an S1-U interface to exchange user plane data via a protocol stack comprising an L1 layer (e.g., PHY 710), an L2 layer (e.g., MAC 720, RLC 730, PDCP 740, and/or SDAP 747), the UDP/IP layer 752, and the GTP-U 753. The S-GW 222 and the P-GW 223 may utilize an S5/S8a interface to exchange user plane data via a protocol stack comprising an L1 layer, an L2 layer, the UDP/IP layer 752, and the GTP-U 753. As discussed previously, NAS protocols may support the mobility of the UE 101 and the session management procedures to establish and maintain IP connectivity between the UE 101 and the P-GW 223.

Moreover, although not shown by FIG. 7, an application layer may be present above the AP 763 and/or the transport network layer 754. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 6110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 8:
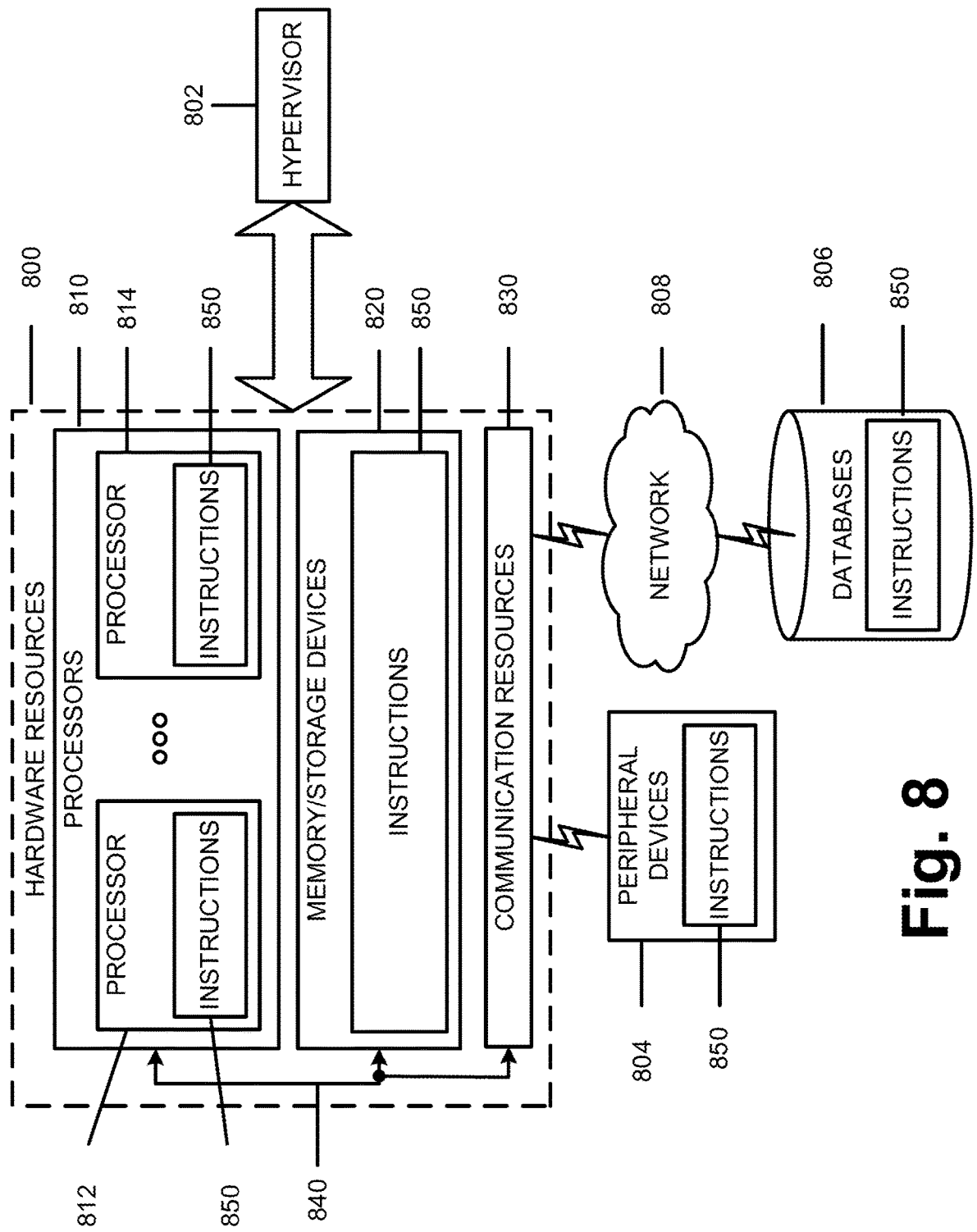
FIG. 8 illustrates a block diagram showing components, according to some example embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processor(s) 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via USB), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding Figures may be configured to operate in accordance with one or more of the examples set forth below. For another example, circuitry associated with a UE, base station, network element, etc. as described above in connection with one or more of the preceding Figures may be configured to operate in accordance with one or more of the examples set forth below in the example section.

The components of FIGS. 1-8 may be used in any of the embodiments described herein.

Figure 9:
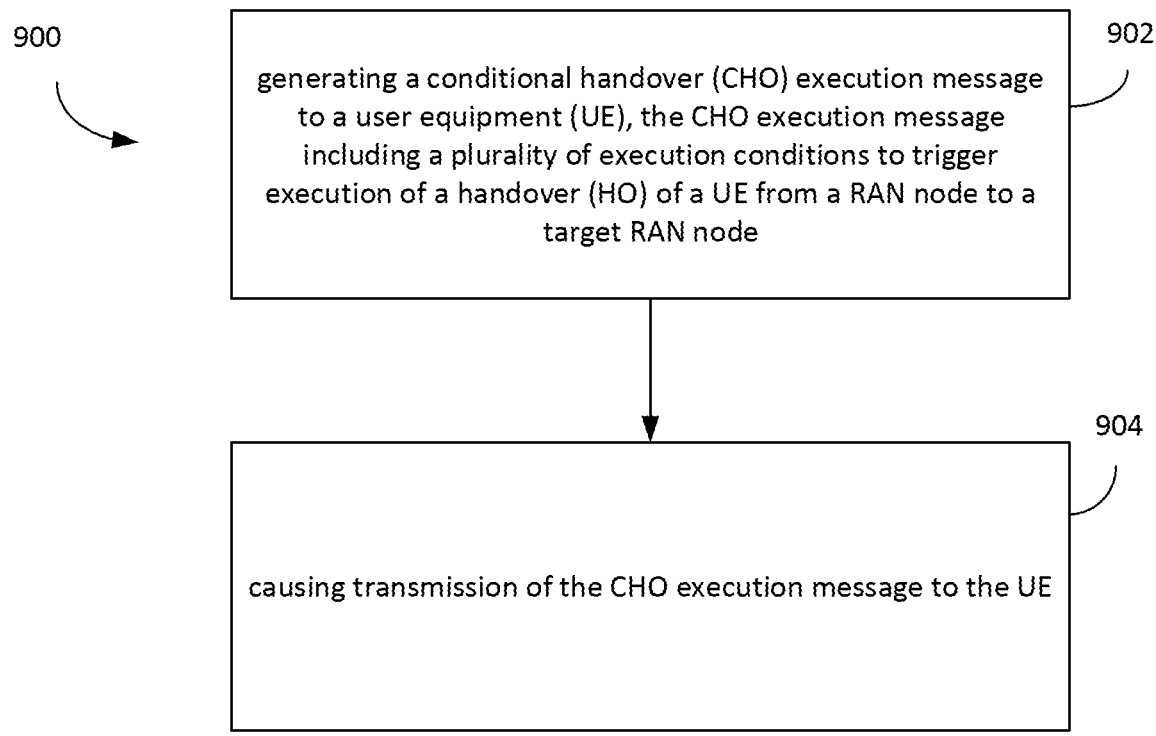
FIG. 9 illustrates a flow according to one method embodiment.
Figure 10:
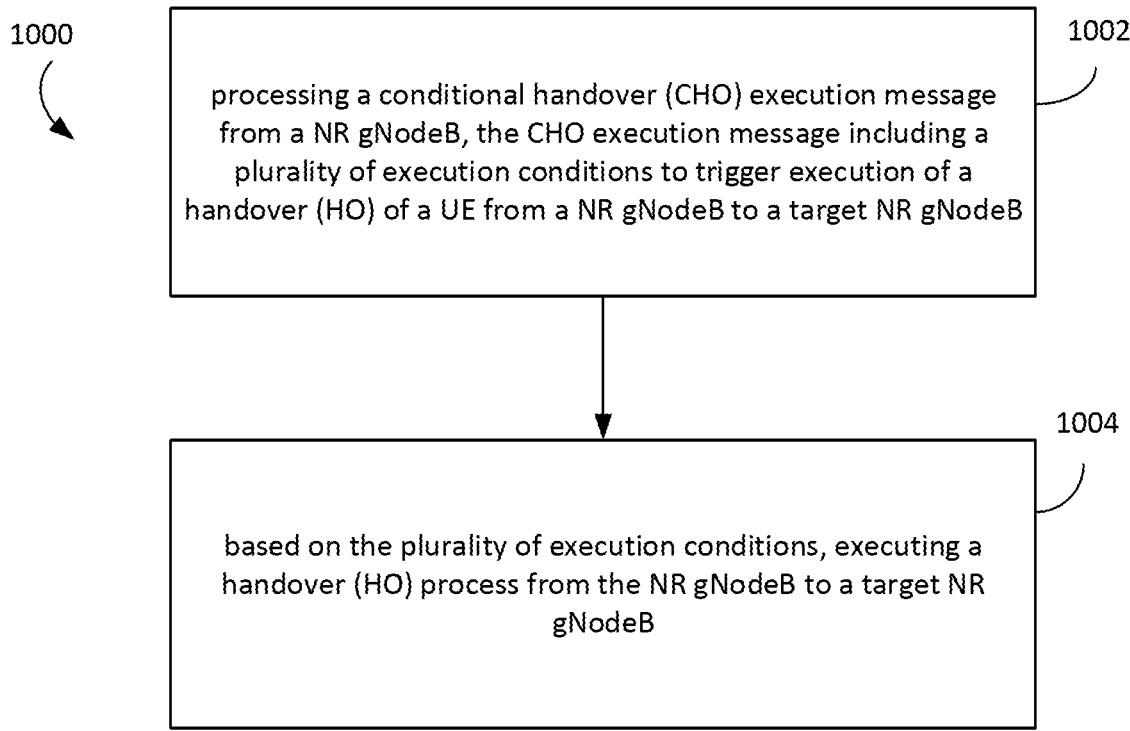
FIG. 10 illustrates a flow according to another method embodiment.

FIGS. 9 and 10 show respective flows for a first and second method according to a first and second embodiment.

FIG. 9 shows a flow 900 for a method to be performed at Radio Access Network (RAN) node according to some embodiments. At operation 902, the flow includes generating a conditional handover (CHO) execution message to a user equipment (UE), the CHO execution message including a plurality of execution conditions to trigger execution of a handover (HO) of the UE from the RAN node to a target RAN node. At operation 904, the flow includes causing transmission of the CHO execution message to the UE.

FIG. 10 shows a flow 1000 for a method to be performed at a UE according to some embodiments. At operation 1002, the flow includes processing a conditional handover (CHO) execution message from a NR gNodeB, the CHO execution message including a plurality of execution conditions to trigger execution of a handover (HO) of the UE from the NR gNodeB to a target NR gNodeB. At operation 1004, the flow includes based on the plurality of execution conditions, executing a handover (HO) process from the NR gNodeB to a target NR gNodeB.

In some embodiments, the electronic device(s), network (s), system(s), chip(s) or component(s), or portions or implementations thereof, of FIGS. 1-9, or some other Fig. herein, may be configured to perform one or more processes, techniques, or methods as described herein, or portions thereof. One such process is depicted in FIG. X-1. For example, the process may include determining or causing to determine a residual rate to identify a decoding estimate of a packet. The process may further include grouping or causing to group users for retransmission. The process may further include determining or causing to determine a power optimization for a lowest transmission power to achieve target error rates. The process may further include identifying or causing to identify a signal to transmit. The process may further include transmitting or causing to transmit the identified signal based upon the determined residual rate, the group of users, and the power optimization.

For one or more embodiments, at least one of the components set forth in one or more of the preceding Figures may be configured to perform one or more operations, techniques, processes, and/or methods as set forth in the example section below. For example, the baseband circuitry as described above in connection with one or more of the preceding Figures may be configured to operate in accordance with one or more of the examples set forth below. For another example, circuitry associated with a UE, base station, network element, etc. as described above in connection with one or more of the preceding Figures may be configured to operate in accordance with one or more of the examples set forth below in the example section.

EXAMPLES

Example 1 includes an apparatus of a New Radio (NR) Radio Access Network (RAN) node, the device comprising: a Radio Frequency (RF) circuitry interface to send and receive messages to and from a RF circuitry; and one or more processors coupled to the RF circuitry interface, the one or more processors to: generate a conditional handover (CHO) execution message to a user equipment (UE), the CHO execution message including a plurality of execution conditions to trigger execution of a handover (HO) of the UE from the RAN node to a target RAN node; and cause transmission of the CHO execution message to the UE.

Example 2 includes the subject matter of Example 1, and optionally, wherein the plurality of execution conditions correspond to respective event identifications (IDs) to identify events to trigger execution of the HO by the UE.

Example 3 includes the subject matter of Example 2, wand optionally, herein the event IDs including information on one or more times to trigger (TTTs) corresponding to an execution trigger time of the HO.

Example 4 includes the subject matter of Example 3, and optionally, wherein the one or more TTTs include one of a common TTT corresponding to all event IDs or separate TTTs corresponding to respective ones of the event IDs.

Example 5 includes the subject matter of Example 1, and optionally, wherein the CHO execution message corresponds to an information element in a radio resource control (RRC) message.

Example 6 includes the subject matter of Example 1, and optionally, wherein the one or more processors are further to: process a measurement report from the UE; and generate and cause to transmit the CHO execution message based on the measurement report.

Example 7 includes the subject matter of Example 1, and optionally, further including a radio front end module coupled to the one or more processors.

Example 8 includes the subject matter of Example 7, and optionally, further including one or more antennas coupled to the radio front end module, the one or more antennas configured to transmit the CHO execution message to the UE.

Example 9 includes one or more non-transitory device comprising instructions to cause an device of a New Radio (NR) radio access node (RAN), upon execution of the instructions by one or more processors of the device, to perform operations including: generating a conditional handover (CHO) execution message to a user equipment (UE), the CHO execution message including a plurality of execution conditions to trigger execution of a handover (HO) of the UE from the RAN node to a target RAN node; and causing transmission of the CHO execution message to the UE.

Example 10 includes the subject matter of Example 9, and optionally, wherein the plurality of execution conditions correspond to respective event identifications (IDs) to identify events to trigger execution of the HO by the UE.

Example 11 includes the subject matter of Example 10, and optionally, wherein the event IDs including information on one or more times to trigger (TTTs) corresponding to an execution trigger time of the HO.

Example 12 includes the subject matter of Example 11, and optionally, wherein the one or more TTTs include one of a common TTT corresponding to all event IDs or separate TTTs corresponding to respective ones of the event IDs.

Example 13 includes the subject matter of Example 9, and optionally, wherein the CHO execution message corresponds to an information element in a radio resource control (RRC) message.

Example 14 includes the subject matter of Example 9, and optionally, wherein the operations further include: processing a measurement report from the UE; and generating and cause to transmit the CHO execution message based on the measurement report.

Example 15 includes a method to be performed by an device of a New Radio (NR) radio access node (RAN) including: generating a conditional handover (CHO) execution message to a user equipment (UE), the CHO execution message including a plurality of execution conditions to trigger execution of a handover (HO) of the UE from the RAN node to a target RAN node; and causing transmission of the CHO execution message to the UE.

Example 16 includes the subject matter of Example 15, and optionally, wherein the plurality of execution conditions correspond to respective event identifications (IDs) to identify events to trigger execution of the HO by the UE.

Example 17 includes the subject matter of Example 16, and optionally, wherein the event IDs including information on one or more times to trigger (TTTs) corresponding to an execution trigger time of the HO.

Example 18 includes the subject matter of Example 17, and optionally, wherein the one or more TTTs include one of a common TTT corresponding to all event IDs or separate TTTs corresponding to respective ones of the event IDs.

Example 19 includes the subject matter of Example 15, and optionally, wherein the CHO execution message corresponds to an information element in a radio resource control (RRC) message.

Example 20 includes the subject matter of Example 15, and optionally, wherein the operations further include: processing a measurement report from the UE; and generating and cause to transmit the CHO execution message based on the measurement report.

Example 21 includes the subject matter of Example 15, and optionally, further including transmitting the CHO execution message to the UE.

Example 22 includes a device of a New Radio Radio Access Network (RAN) node, the device comprising: means for generating a conditional handover (CHO) execution message to a user equipment (UE), the CHO execution message including a plurality of execution conditions to trigger execution of a handover (HO) of the UE from the RAN node to a target RAN node; and means for causing transmission of the CHO execution message to the UE.

Example 23 includes the subject matter of Example 22, and optionally, wherein the plurality of execution conditions correspond to respective event identifications (IDs) to identify events to trigger execution of the HO by the UE.

Example 24 includes the subject matter of Example 23, and optionally, wherein the event IDs including information on one or more times to trigger (TTTs) corresponding to an execution trigger time of the HO.

Example 25 includes the subject matter of Example 24, and optionally, wherein the one or more TTTs include one of a common TTT corresponding to all event IDs or separate TTTs corresponding to respective ones of the event IDs.

Example 26 includes the subject matter of Example 22, and optionally, wherein the CHO execution message corresponds to an information element in a radio resource control (RRC) message.

Example 27 includes the subject matter of Example 22, and optionally, further including: means for processing a measurement report from the UE; and means for generating and cause to transmit the CHO execution message based on the measurement report.

Example 28 includes the subject matter of Example 22, and optionally, further including means for transmitting the CHO execution message to the UE.

Example 29 includes a device of a New Radio User Equipment (UE), the device comprising: a Radio Frequency (RF) circuitry interface to send and receive messages to and from a RF circuitry; and one or more processors coupled to the RF circuitry interface, the one or more processors to: process a conditional handover (CHO) execution message from a NR gNodeB, the CHO execution message including a plurality of execution conditions to trigger execution of a handover (HO) of the UE from the NR gNodeB to a target NR gNodeB; and based on the plurality of execution conditions, execute a handover (HO) process from the NR gNodeB to a target NR gNodeB.

Example 30 includes the subject matter of Example 29, and optionally, wherein the plurality of execution conditions correspond to respective event identifications (IDs) to identify events to trigger execution of the HO by the UE.

Example 31 includes the subject matter of Example 30, and optionally, wherein the event IDs including information on one or more times to trigger (TTTs) corresponding to an execution trigger time of the HO.

Example 32 includes the subject matter of Example 31, and optionally, wherein the one or more TTTs include one of a common TTT corresponding to all event IDs or separate TTTs corresponding to respective ones of the event IDs.

Example 33 includes the subject matter of Example 29, and optionally, wherein the CHO execution message corresponds to an information element in a radio resource control (RRC) message.

Example 34 includes the subject matter of Example 29, and optionally, wherein the one or more processors are further to determine whether entering conditions of the plurality of execution conditions have been met.

Example 35 includes the subject matter of Example 29, and optionally, further including a radio front end module coupled to the one or more processors.

Example 36 includes the subject matter of Example 35, and optionally, further including one or more antennas coupled to the radio front end module, the one or more antennas configured to receive the CHO execution message from the NR gNodeB.

Example 37 includes one or more non-transitory device comprising instructions to cause an device of a New Radio (NR) User Equipment (UE), upon execution of the instructions by one or more processors of the device, to perform operations including: processing a conditional handover (CHO) execution message from a NR gNodeB, the CHO execution message including a plurality of execution conditions to trigger execution of a handover (HO) of the UE from the NR gNodeB to a target NR gNodeB; and based on the plurality of execution conditions, executing a handover (HO) process from the NR gNodeB to a target NR gNodeB.

Example 38 includes the subject matter of Example 37, and optionally, wherein the plurality of execution conditions correspond to respective event identifications (IDs) to identify events to trigger execution of the HO by the UE.

Example 39 includes the subject matter of Example 38, and optionally, wherein the event IDs including information on one or more times to trigger (TTTs) corresponding to an execution trigger time of the HO.

Example 40 includes the subject matter of Example 39, and optionally, wherein the one or more TTTs include one of a common TTT corresponding to all event IDs or separate TTTs corresponding to respective ones of the event IDs.

Example 41 includes the subject matter of Example 37, and optionally, wherein the CHO execution message corresponds to an information element in a radio resource control (RRC) message.

Example 42 includes the subject matter of Example 37, and optionally, wherein the operations further include determining whether entering conditions of the plurality of execution conditions have been met.

Example 43 includes a method to be performed by an device of a New Radio (NR) User Equipment (UE) including: processing a conditional handover (CHO) execution message from a NR gNodeB, the CHO execution message including a plurality of execution conditions to trigger execution of a handover (HO) of the UE from the NR gNodeB to a target NR gNodeB; and based on the plurality of execution conditions, executing a handover (HO) process from the NR gNodeB to a target NR gNodeB.

Example 44 includes the subject matter of Example 43, and optionally, wherein the plurality of execution conditions correspond to respective event identifications (IDs) to identify events to trigger execution of the HO by the UE.

Example 45 includes the subject matter of Example 44, and optionally, wherein the event IDs including information on one or more times to trigger (TTTs) corresponding to an execution trigger time of the HO.

Example 46 includes the subject matter of Example 45, and optionally, wherein the one or more TTTs include one of a common TTT corresponding to all event IDs or separate TTTs corresponding to respective ones of the event IDs.

Example 47 includes the subject matter of Example 43, and optionally, wherein the CHO execution message corresponds to an information element in a radio resource control (RRC) message.

Example 48 includes the subject matter of Example 43, and optionally, wherein the operations further include determining whether entering conditions of the plurality of execution conditions have been met.

Example 49 includes the subject matter of Example 43, and optionally, further including receiving the CHO execution message from the NR gNodeB.

Example 50 includes a device of a New Radio (NR) User Equipment, the device comprising: means for processing a conditional handover (CHO) execution message from a NR gNodeB, the CHO execution message including a plurality of execution conditions to trigger execution of a handover (HO) of the UE from the NR gNodeB to a target NR gNodeB; and means for executing, based on the plurality of execution conditions, a handover (HO) process from the NR gNodeB to a target NR gNodeB.

Example 51 includes the subject matter of Example 50, and optionally, wherein the plurality of execution conditions correspond to respective event identifications (IDs) to identify events to trigger execution of the HO by the UE.

Example 52 includes the subject matter of Example 51, and optionally, wherein the event IDs including information on one or more times to trigger (TTTs) corresponding to an execution trigger time of the HO.

Example 53 includes the subject matter of Example 52, and optionally, wherein the one or more TTTs include one of a common TTT corresponding to all event IDs or separate TTTs corresponding to respective ones of the event IDs.

Example 54 includes the subject matter of Example 50, and optionally, wherein the CHO execution message corresponds to an information element in a radio resource control (RRC) message.

Example 55 includes the subject matter of Example 50, and optionally, further including means for determining whether entering conditions of the plurality of execution conditions have been met.

Example 56 includes the subject matter of Example 50, and optionally, further including means for receiving the CHO execution message from the NR gNodeB.

Example 57 may include an device comprising means to perform one or more elements of a method described in or related to any of the Examples above, or any other method or process described herein.

Example 58 may include one or more non-transitory device comprising instructions to cause an electronic device, upon execution of the instructions by one or more processors of the electronic device, to perform one or more elements of a method described in or related to any of the Example above, or any other method or process described herein.

Example 59 may include an apparatus comprising logic, modules, or circuitry to perform one or more elements of a method described in or related to any of the Example above, or any other method or process described herein.

Example 60 may include a method, technique, or process as described in or related to any of the Examples above, or portions or parts thereof.

Example 61 may include an apparatus comprising: one or more processors and one or more computer-readable media comprising instructions that, when executed by the one or more processors, cause the one or more processors to perform the method, techniques, or process as described in or related to any of the Examples above, or portions thereof.

Example 62 may include a signal as described in or related to any of the Examples above, or portions or parts thereof.

Example 63 may include a datagram, packet, frame, segment, protocol data unit (PDU), or message as described in or related to any of the Examples above, or portions or parts thereof, or otherwise described in the present disclosure.

Example 64 may include a signal encoded with data as described in or related to any of the Examples above, or portions or parts thereof, or otherwise described in the present disclosure.

Example 65 may include a signal encoded with a datagram, packet, frame, segment, protocol data unit (PDU), or message as described in or related to any of the Examples above, or portions or parts thereof, or otherwise described in the present disclosure.

Example 66 may include an electromagnetic signal carrying computer-readable instructions, wherein execution of the computer-readable instructions by one or more processors is to cause the one or more processors to perform the method, techniques, or process as described in or related to any of the Examples above, or portions thereof.

Example 67 may include a computer program comprising instructions, wherein execution of the program by a processing element is to cause the processing element to carry out the method, techniques, or process as described in or related to any of the Examples above, or portions thereof.

Example 68 may include a signal in a wireless network as shown and described herein.

Example 69 may include a method of communicating in a wireless network as shown and described herein.

Example 70 may include a system for providing wireless communication as shown and described herein.

Example 71 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus of a New Radio (NR) Radio Access Network (RAN) node (NR gNodeB), the apparatus comprising:
   a Radio Frequency (RF) circuitry interface to send and receive messages to and from a RF circuitry; and
   one or more processors coupled to the RF circuitry interface, the one or more processors to:
      generate a conditional handover (CHO) execution message to a user equipment (UE), the CHO execution message including a plurality of execution conditions to trigger execution of a handover (HO) of the UE from the NR gNodeB to a target NR gNodeB, wherein the plurality of execution conditions correspond to respective event identifications (IDs) to identify events to trigger execution of the HO by the UE, and wherein each of the event IDs includes one of an A3 event or an A5 event, and information on a corresponding time to trigger (TTT); and
      cause transmission of the CHO execution message to the UE.

2. The apparatus of claim 1, wherein the CHO execution message corresponds to an information element in a radio resource control (RRC) message.

3. The apparatus of claim 1, wherein the one or more processors are further to:
   process a measurement report from the UE; and
   generate and cause to transmit the CHO execution message based on the measurement report.

4. The apparatus of claim 1, further including a radio front end module coupled to the one or more processors.

5. The apparatus of claim 4, further including one or more antennas coupled to the radio front end module, the one or more antennas configured to transmit the CHO execution message to the UE.

6. One or more non-transitory computer-readable media comprising instructions to cause an apparatus of a New Radio (NR) User Equipment (UE), upon execution of the instructions by one or more processors of the apparatus, to perform operations including:
   processing a conditional handover (CHO) execution message from a NR gNodeB, the CHO execution message including a plurality of execution conditions to trigger execution of a handover (HO) of the UE from the NR gNodeB to a target NR gNodeB, wherein the plurality of execution conditions correspond to respective event identifications (IDs) to identify events to trigger execution of the HO by the UE, and wherein each of the event IDs includes one of an A3 event or an A5 event, and information on a corresponding time to trigger (TTT); and
   based on the plurality of execution conditions, executing a handover (HO) process from the NR gNodeB to a target NR gNodeB.

7. The computer-readable media of claim 6, wherein the CHO execution message corresponds to an information element in a radio resource control (RRC) message.

8. The computer-readable media of claim 6, wherein the operations further include determining whether entering conditions of the plurality of execution conditions have been met.

9. A method to be performed by an apparatus of a New Radio (NR) radio access node (RAN) including:
   generating a conditional handover (CHO) execution message to a user equipment (UE), the CHO execution message including a plurality of execution conditions to trigger execution of a handover (HO) of the UE from the RAN node to a target RAN node, wherein the plurality of execution conditions correspond to respective event identifications (IDs) to identify events to trigger execution of the HO by the UE, and wherein each of the event IDs includes one of an A3 event or an A5 event, and information on a corresponding time to trigger (TTT); and
   causing transmission of the CHO execution message to the UE.

10. The method of claim 9, wherein the CHO execution message corresponds to an information element in a radio resource control (RRC) message.

11. The method of claim 9, wherein the method further includes:
  processing a measurement report from the UE; and
  generating and cause to transmit the CHO execution message based on the measurement report.

12. The method of claim 9, further including transmitting the CHO execution message to the UE.

13. An apparatus of a New Radio (NR) Radio Access Network (RAN) node, the apparatus comprising:
  means for generating a conditional handover (CHO) execution message to a user equipment (UE), the CHO execution message including a plurality of execution conditions to trigger execution of a handover (HO) of the UE from the RAN node to a target RAN node, wherein the plurality of execution conditions correspond to respective event identifications (IDs) to identify events to trigger execution of the HO by the UE, and wherein each of the event IDs includes one of an A3 event or an A5 event, and information on a corresponding time to trigger (TTT); and
  means for causing transmission of the CHO execution message to the UE.

14. The apparatus of claim 13, wherein the one or more TTTs include one of a common TTT corresponding to all event IDs or separate TTTs corresponding to respective ones of the event IDs.

* * * * *